US010612666B2

(12) United States Patent
Tokunaga

(10) Patent No.: US 10,612,666 B2
(45) Date of Patent: Apr. 7, 2020

(54) SLIDING COMPONENT

(71) Applicant: EAGLE INDUSTRY CO., LTD., Minato-ku, Tokyo (JP)

(72) Inventor: Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 262 days.

(21) Appl. No.: 15/939,253

(22) Filed: Mar. 28, 2018

(65) Prior Publication Data

US 2018/0223996 A1    Aug. 9, 2018

Related U.S. Application Data

(63) Continuation-in-part of application No. 14/403,519, filed as application No. PCT/JP2013/073746 on Sep. 4, 2013, now abandoned.

(30) Foreign Application Priority Data

Sep. 11, 2012    (JP) ................................. 2012-199489

(51) Int. Cl.
*F16J 15/34* (2006.01)
*F16J 15/36* (2006.01)
*F16J 15/16* (2006.01)

(52) U.S. Cl.
CPC ......... *F16J 15/3412* (2013.01); *F16J 15/164* (2013.01); *F16J 15/3448* (2013.01); *F16J 15/36* (2013.01)

(58) Field of Classification Search
CPC .. F16J 15/3404; F16J 15/3408; F16J 15/3412; F16J 15/3416; F16J 15/3424; F16J 15/3428; F16J 15/3432
See application file for complete search history.

(56) References Cited

U.S. PATENT DOCUMENTS

| 5,174,584 | A  | 12/1992 | Lahrman ............... F16J 15/3412 |
| 5,447,316 | A  | 9/1995  | Matsui .................. F16J 15/3412 |
| 5,501,470 | A  | 3/1996  | Fuse et al. |
| 5,529,317 | A  | 6/1996  | Muller |
| 6,213,473 | B1 | 4/2001  | Lebeck .................. F16J 15/342 |
| 7,044,470 | B2 | 5/2006  | Zheng .................. F16J 15/3448 |
| 7,931,277 | B2 | 4/2011  | Garrison ............... F01D 25/183 |
| 9,234,594 | B2 | 1/2016  | Inoue ................... F16J 15/3424 |

(Continued)

FOREIGN PATENT DOCUMENTS

| CN | 1401924   | 3/2003 |
| CN | 104185756 | 12/2014 |

(Continued)

OTHER PUBLICATIONS

First Notification of Reason for Refusal with Search Report issued by the State Intellectual Property Office of China dated Oct. 9, 2015 for Chinese counterpart application No. 201380027097.9.

(Continued)

*Primary Examiner* — Vishal A Patel
(74) *Attorney, Agent, or Firm* — Hayes Soloway P.C.

(57) ABSTRACT

To prevent leakage regardless of the level of differential pressure between the inner periphery and outer periphery of the sealing face, the sliding component has dimples provided on one sealing face of a pair of sliding parts that mutually slide relative to each other, and grooves with directionality are provided in a cavitation formation area in each dimple.

12 Claims, 13 Drawing Sheets

(56) References Cited

U.S. PATENT DOCUMENTS

| | | | |
|---|---|---|---|
| 9,347,566 B2 | 5/2016 | Tokunaga | F16J 15/3412 |
| 9,494,239 B2 | 11/2016 | Hosoe | F16J 15/3412 |
| 9,664,288 B2 | 5/2017 | Ikeda | F16J 15/164 |
| 2002/0109302 A1 | 8/2002 | Muraki | F16J 15/3484 |
| 2005/0212217 A1 | 9/2005 | Tejima | |
| 2011/0101616 A1 | 5/2011 | Teshima | F16J 15/3424 |
| 2014/0159314 A1 | 6/2014 | Hosoe et al. | |
| 2015/0042045 A1 | 2/2015 | Inoue et al. | |

FOREIGN PATENT DOCUMENTS

| | | | |
|---|---|---|---|
| EP | 2230425 | 9/2010 | F16J 15/3424 |
| JP | H07035242 | 2/1995 | |
| JP | H08277941 | 10/1996 | |
| JP | H09329247 | 12/1997 | |
| JP | 2005180652 | 7/2005 | |
| JP | 2009014183 | 1/2009 | |
| JP | 2012002295 | 1/2012 | |
| WO | WO2009087995 | 7/2009 | |
| WO | WO2013031529 | 3/2013 | |

OTHER PUBLICATIONS

International Search Report dated Oct. 8, 2013, issued for International application No. PCT/JP2013/073746.

Notification of Transmittal of Translation of the International Preliminary Report on Patentability (PCT/IB/338) dated Mar. 26, 2015, with International Preliminary Report on Patentability (PCT/IB/373) and Written Opinion of the International Searching Authority (PCT/ISA/237), for corresponding international application PCT/JP2013/073746.

Office Action issued in U.S. Appl. No. 14/403,519, dated Apr. 6, 2017 (26 pgs).

Office Action issued in U.S. Appl. No. 14/403,519, dated Dec. 1, 2017 (10 pgs).

Office Action issued in U.S. Appl. No. 14/403,519, dated Jul. 19, 2017 (11 pgs).

Office Action issued in U.S. Appl. No. 14/403,519, dated Sep. 20, 2017 (2 pgs).

Second Notification of Reason for Refusal with Search Report issued by the State Intellectual Property Office of China dated May 30, 2016 for Chinese counterpart application No. 201380027097.9.

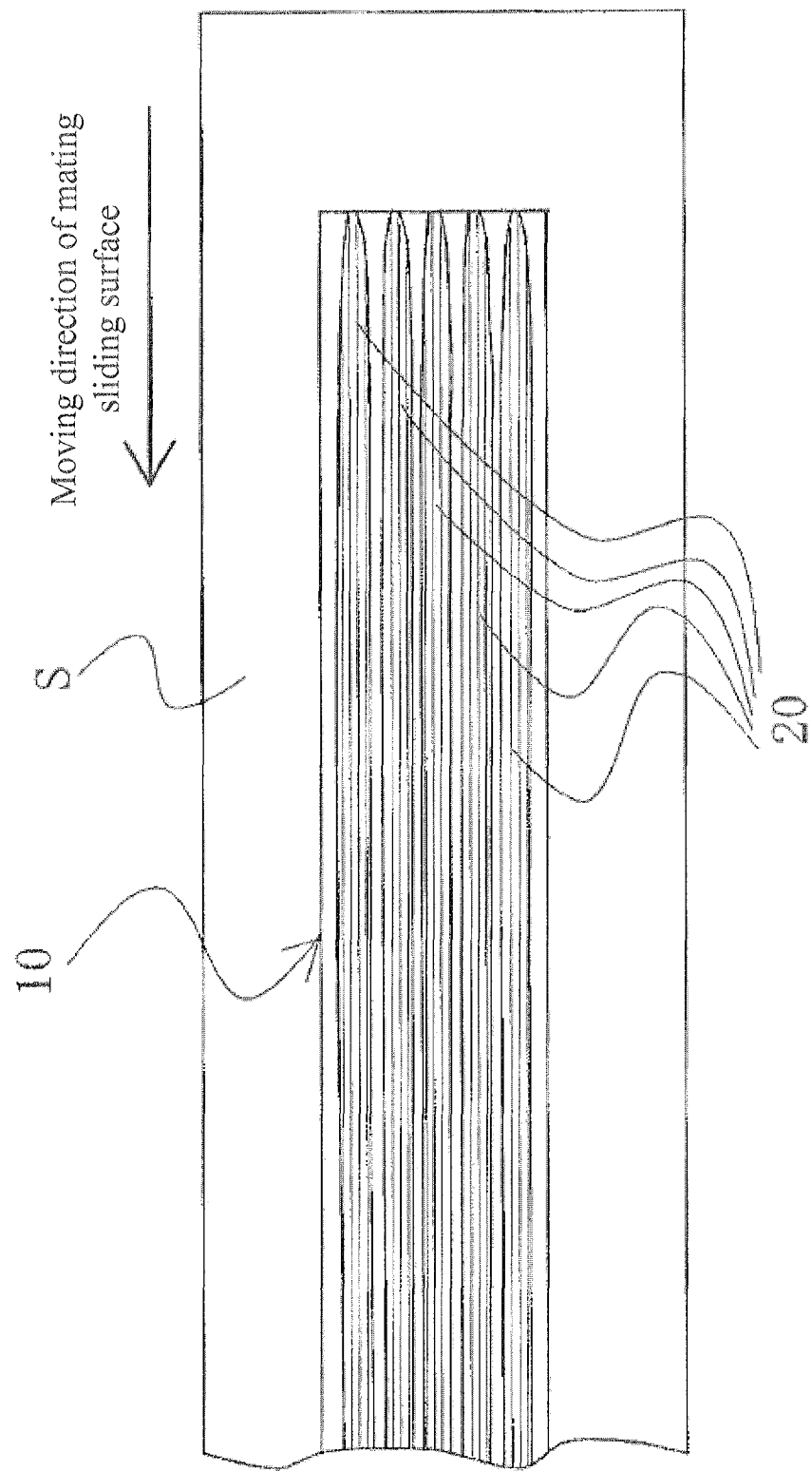
[Fig. 1]

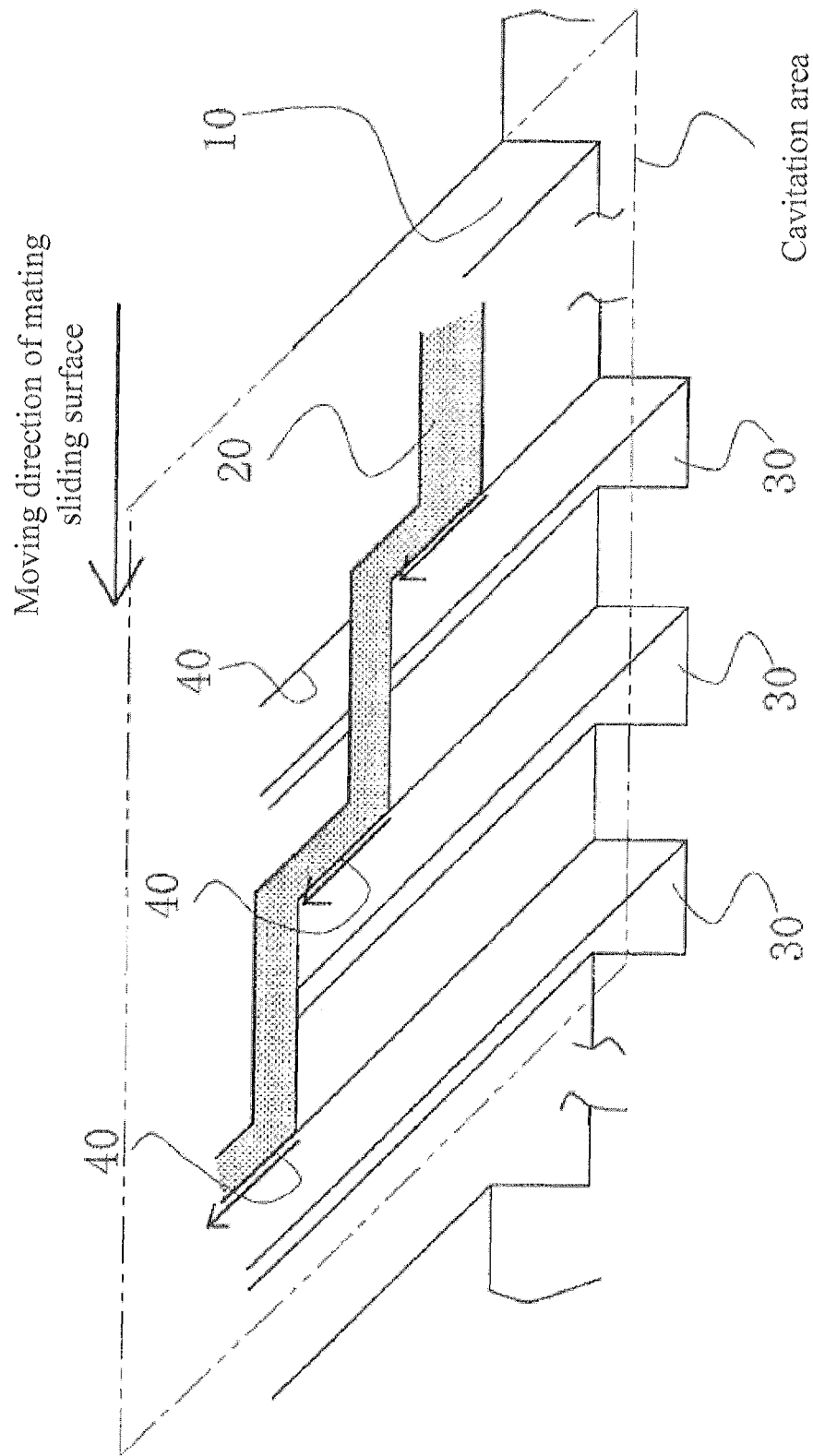

[Fig. 3]
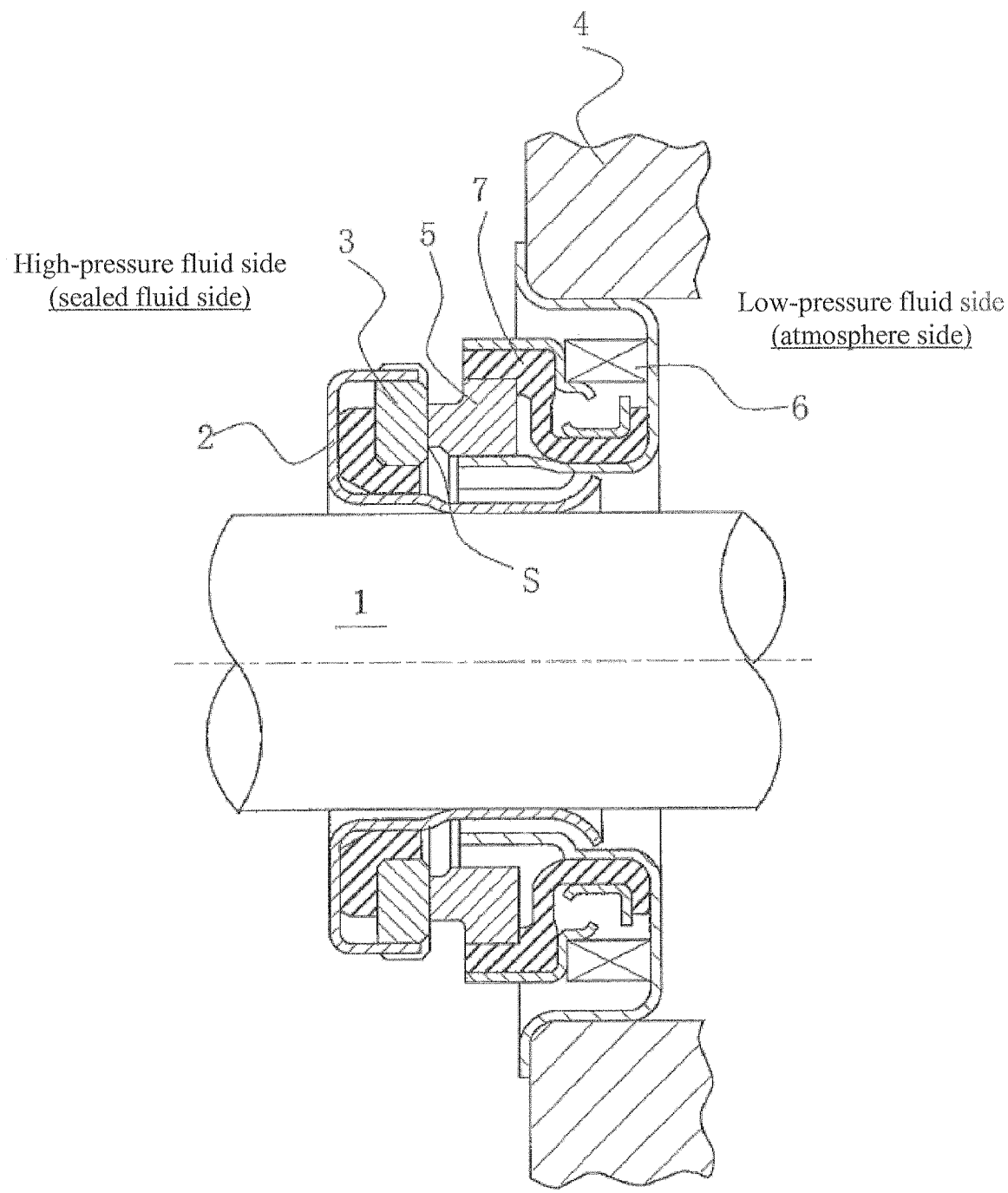

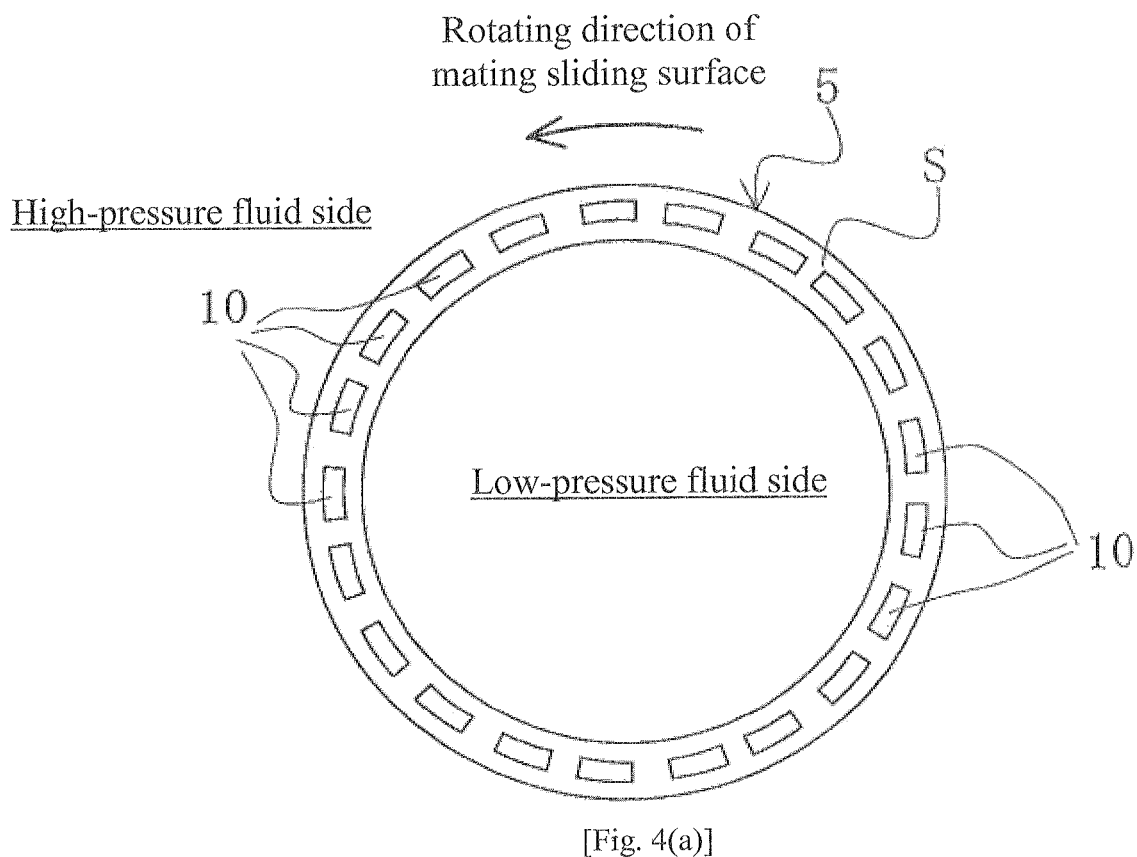
[Fig. 4(a)]
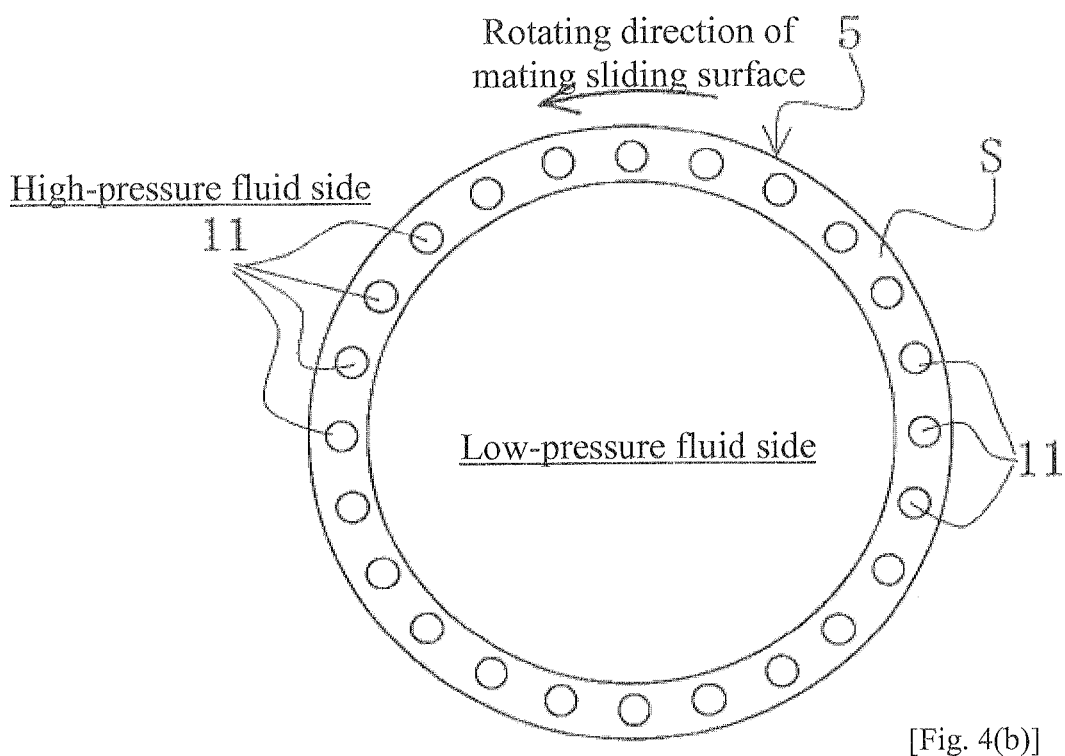
[Fig. 4(b)]

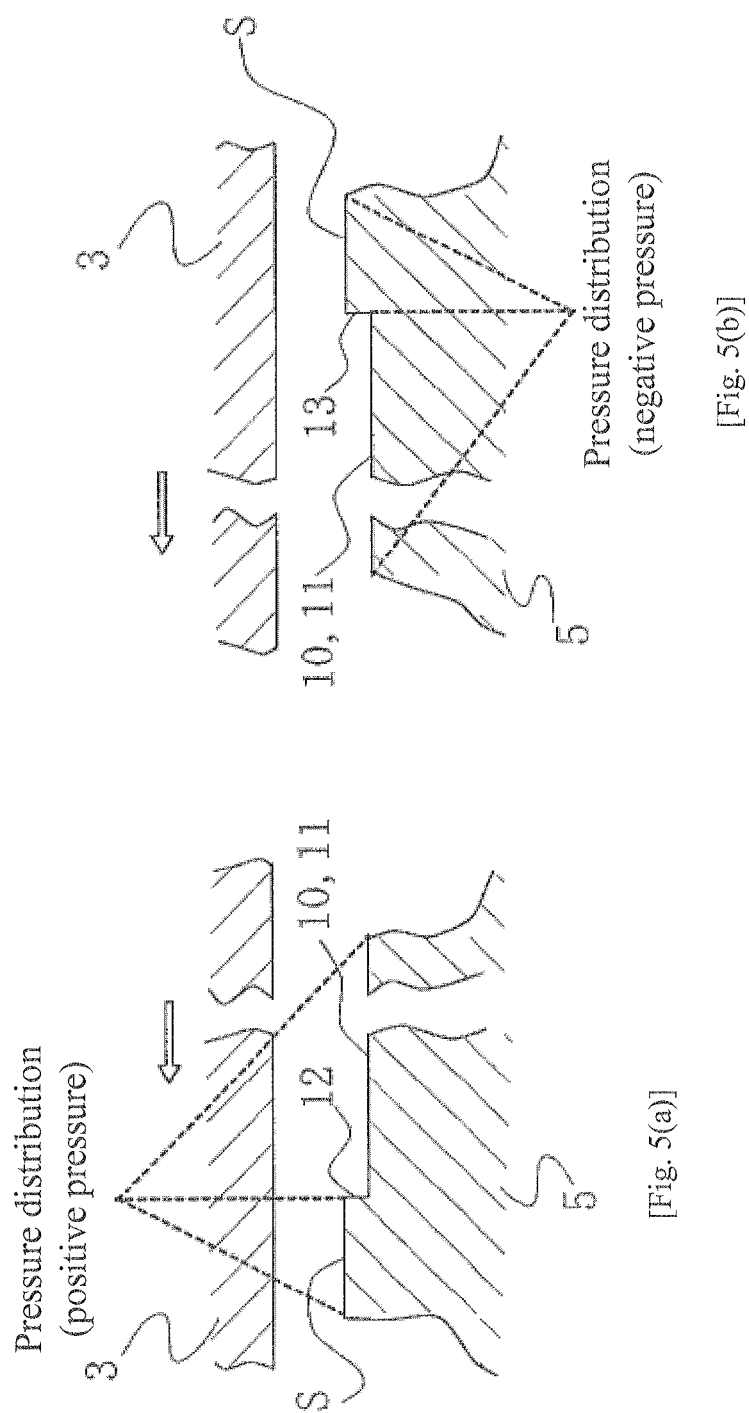

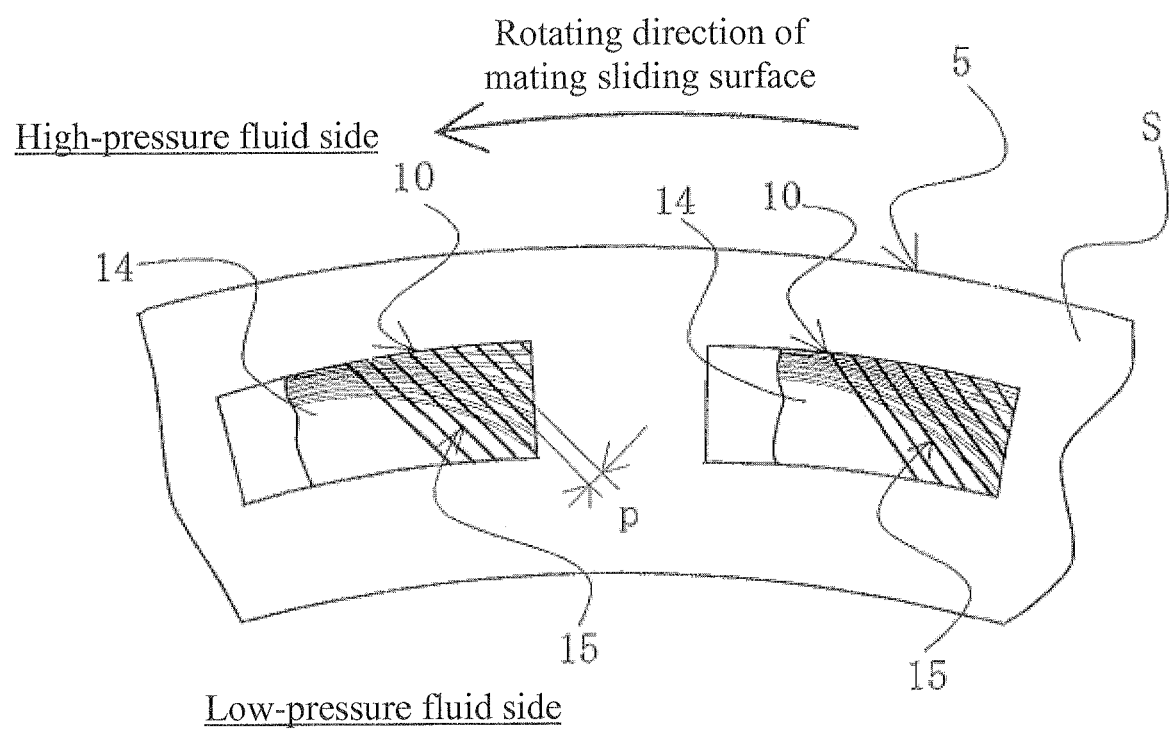
[Fig. 6(a)]
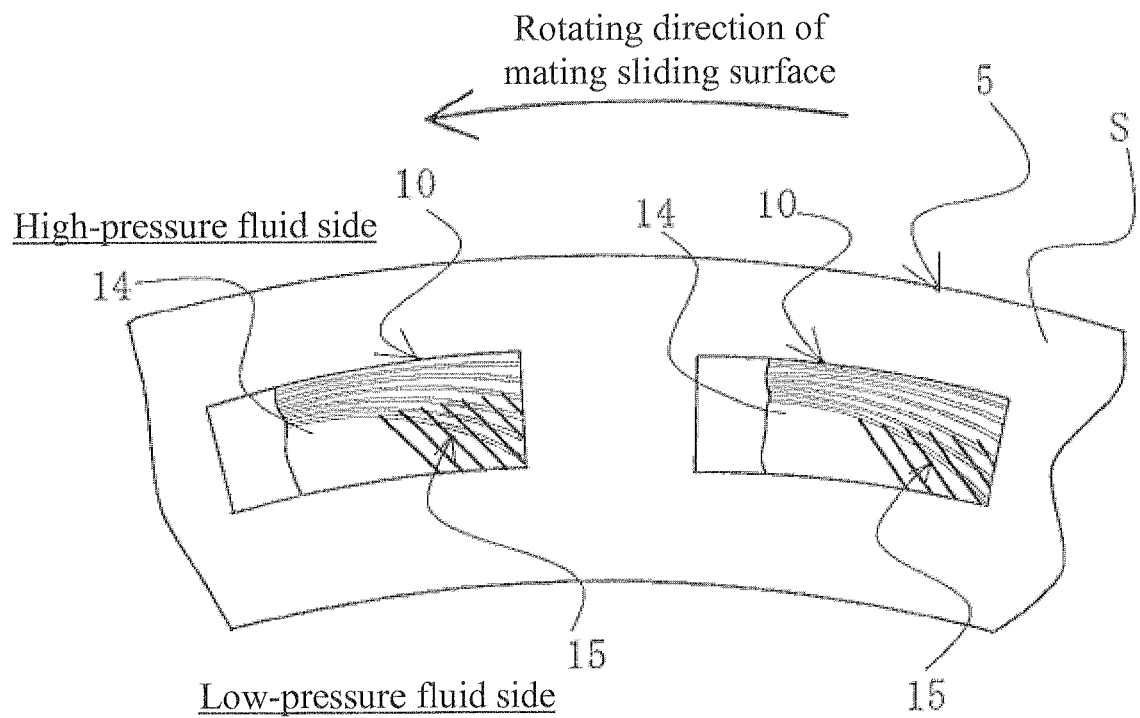
[Fig. 6(b)]

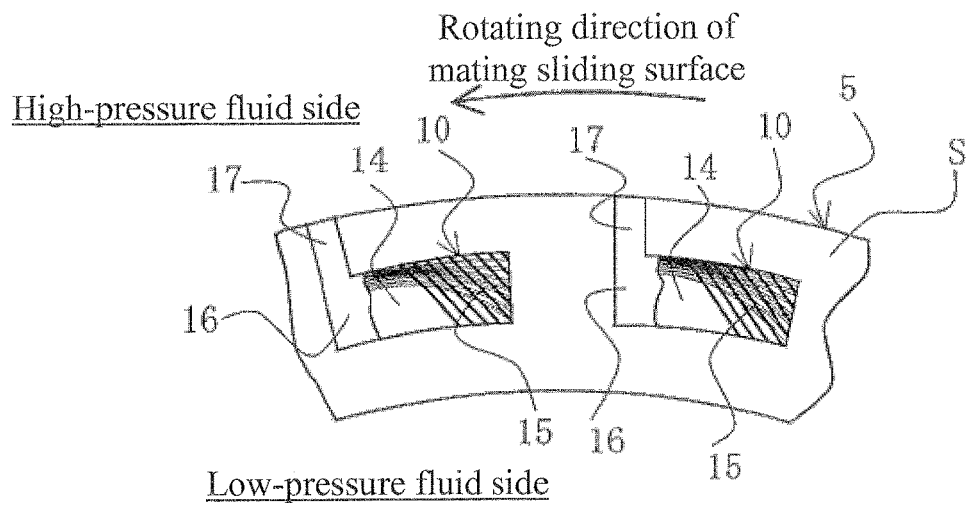
[Fig. 7(a)]
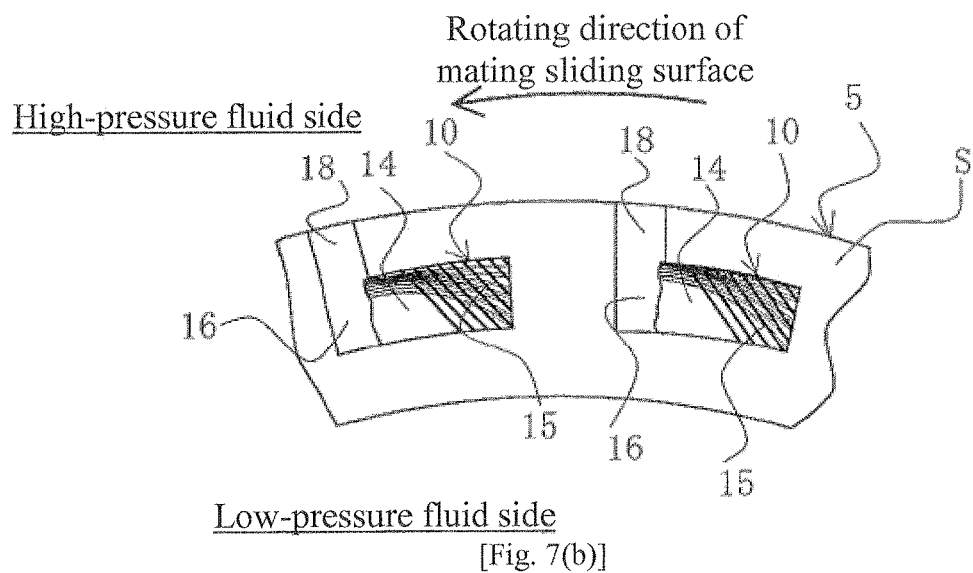
[Fig. 7(b)]
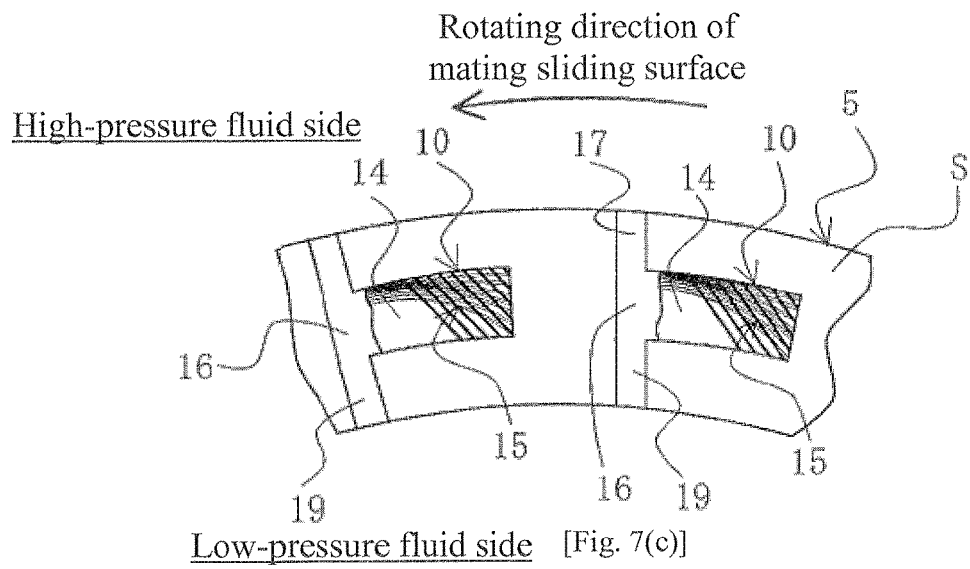
[Fig. 7(c)]

[Fig. 8]
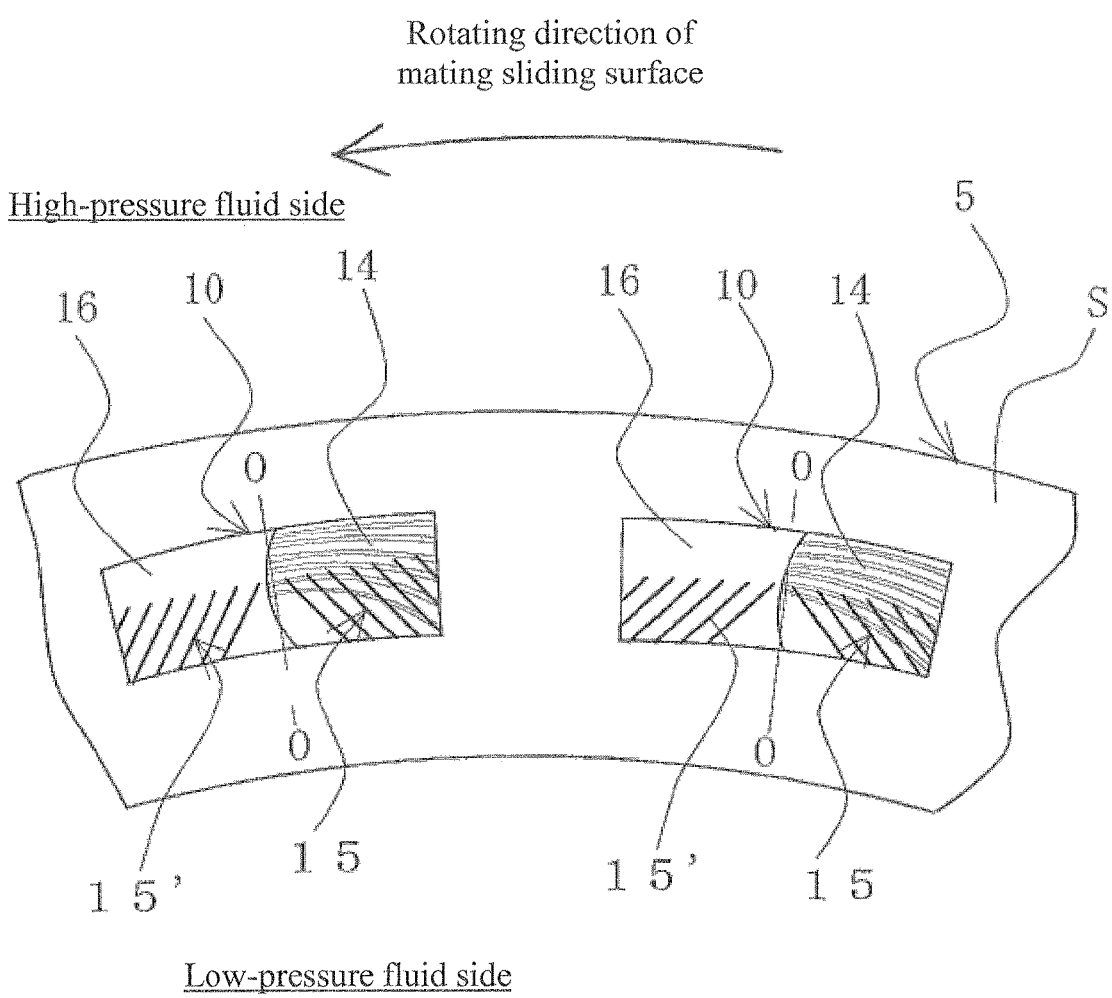

[Fig. 9]
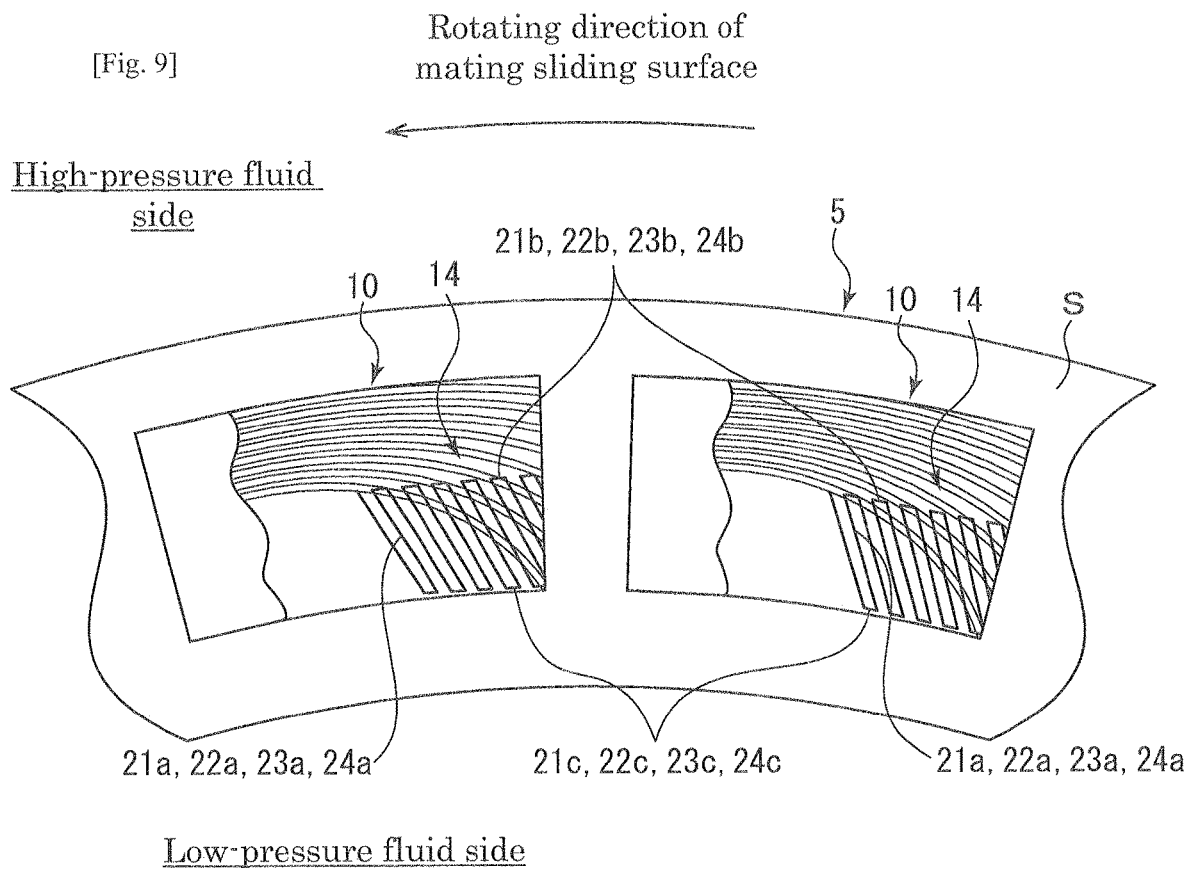
[Fig. 10]
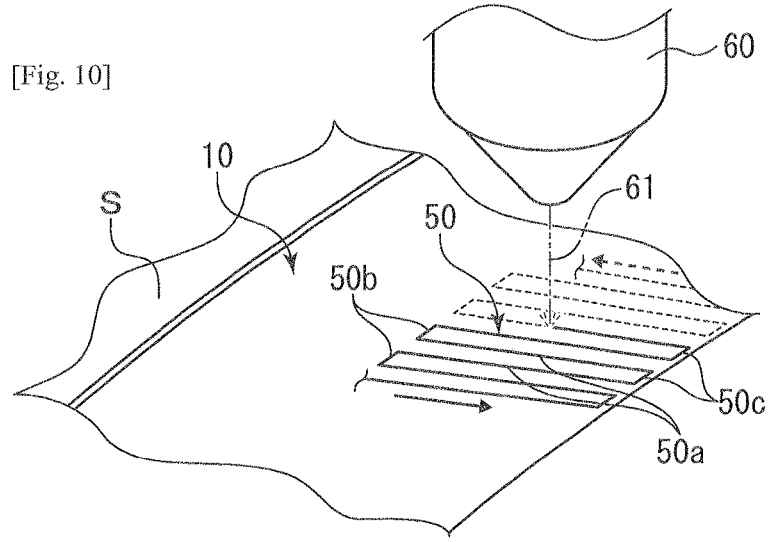

[Fig. 11(a)]
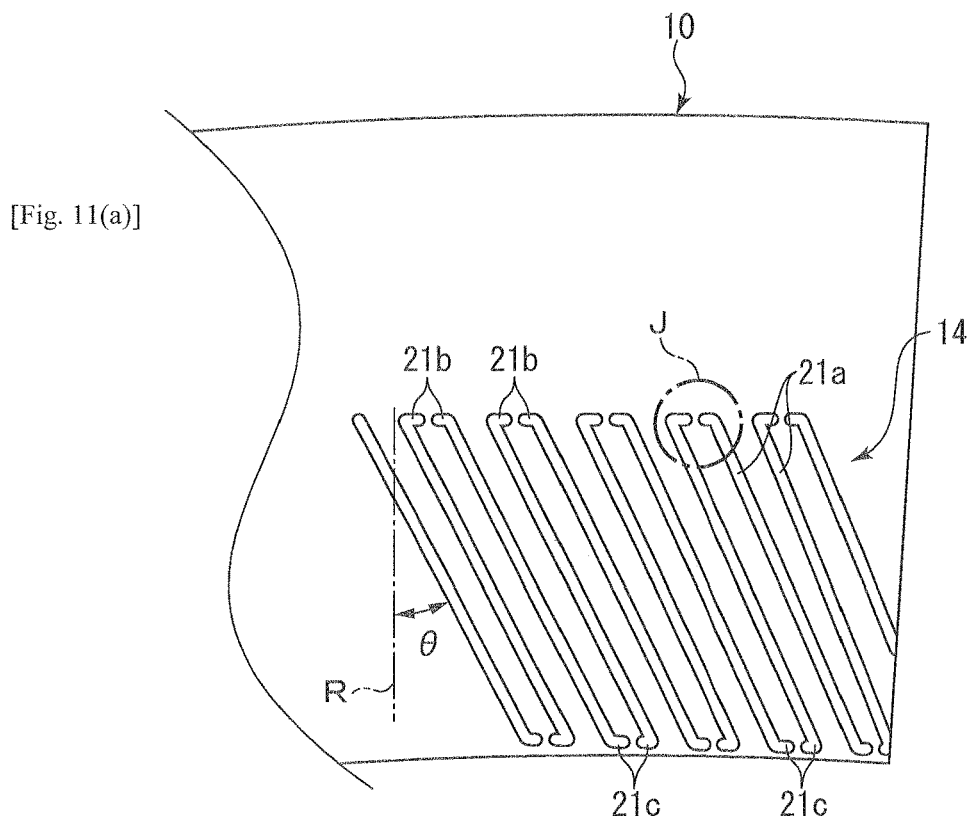
[Fig. 11(b)]
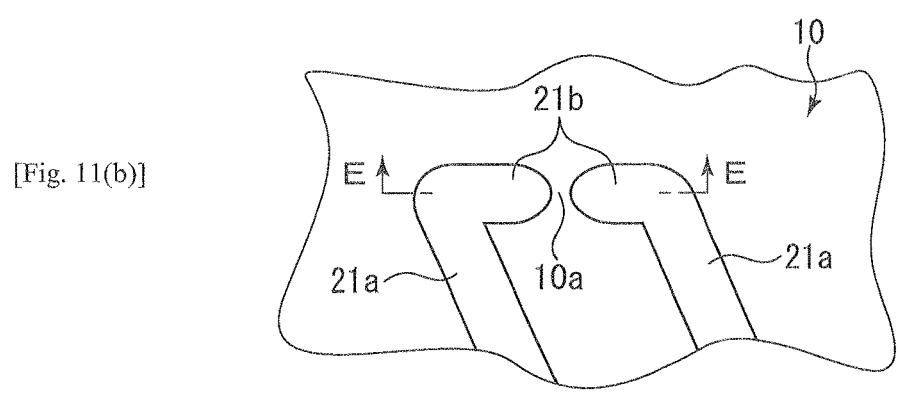
[Fig. 11(c)]
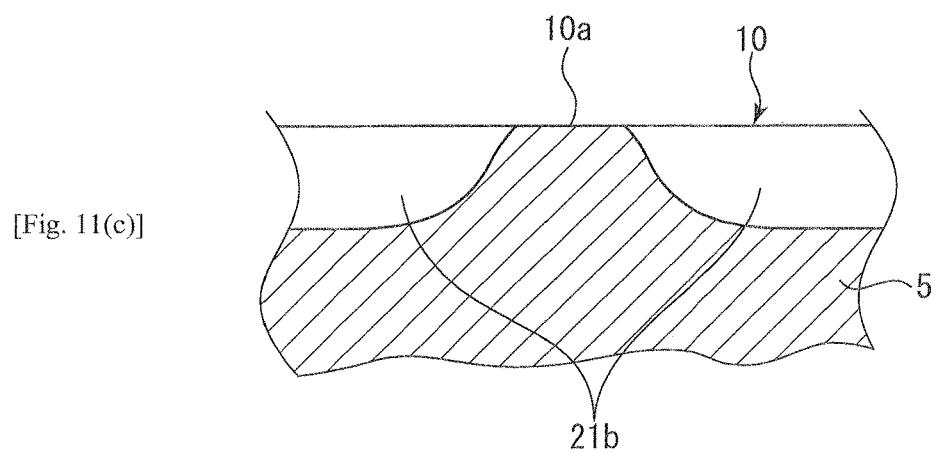

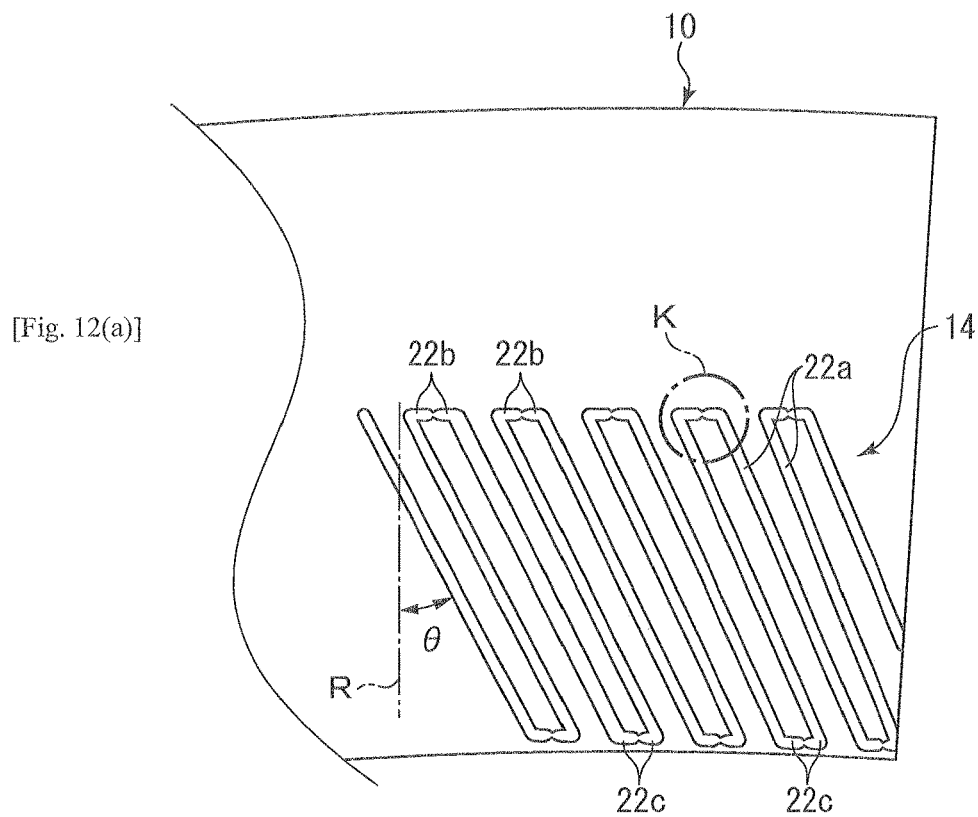
[Fig. 12(a)]
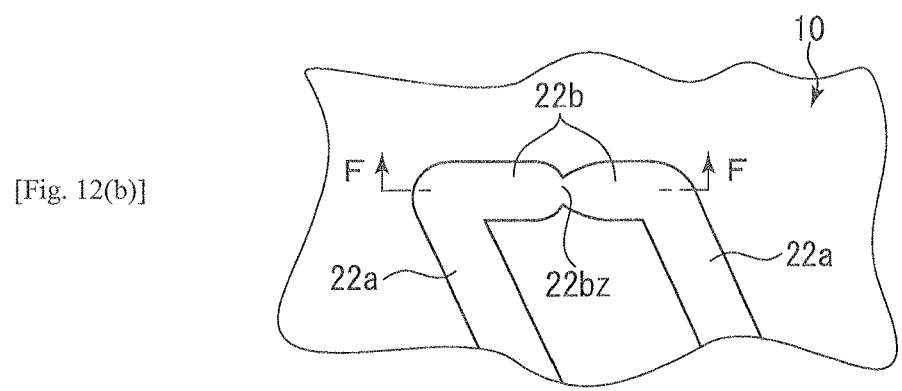
[Fig. 12(b)]
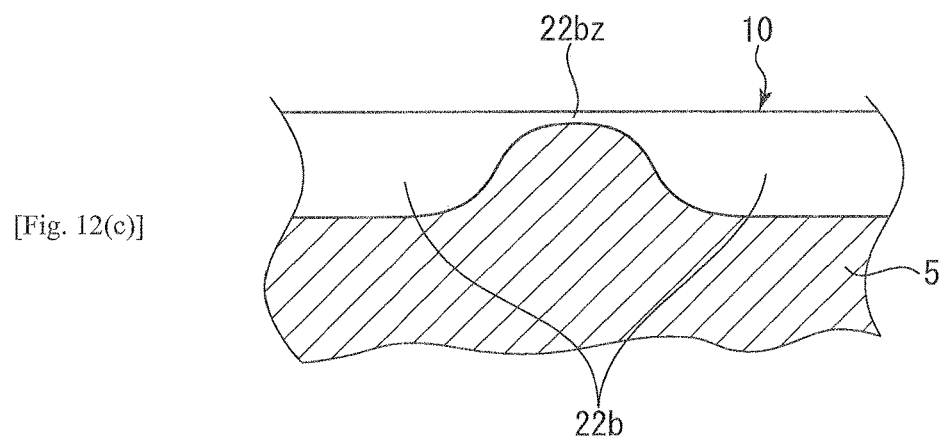
[Fig. 12(c)]

[Fig. 13]
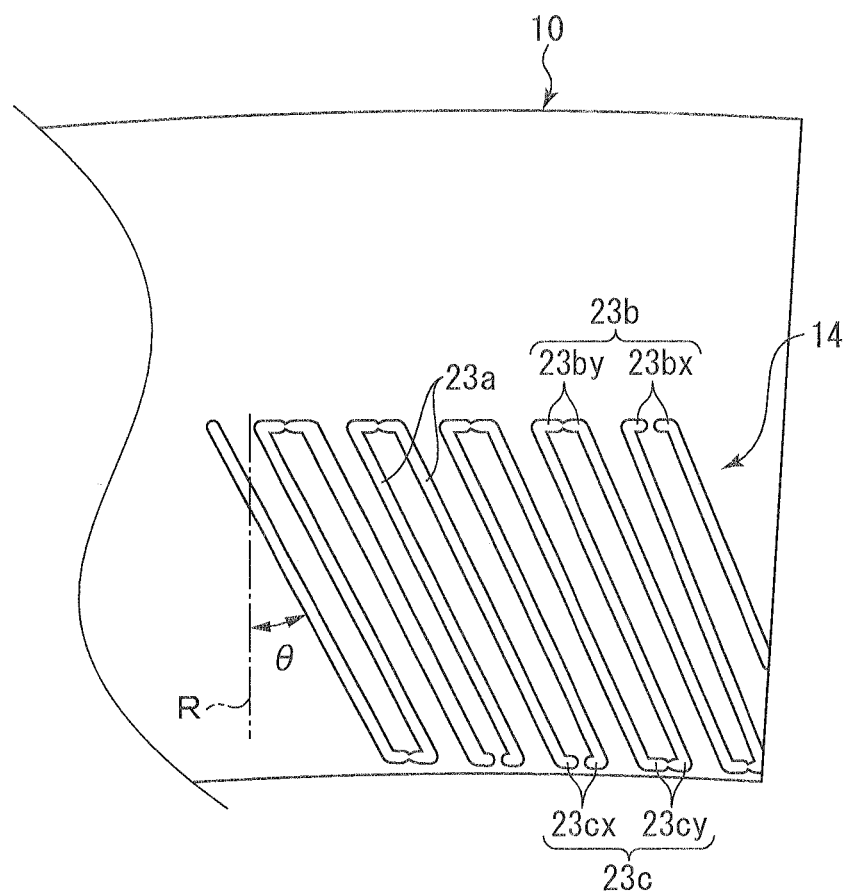
[Fig. 14]
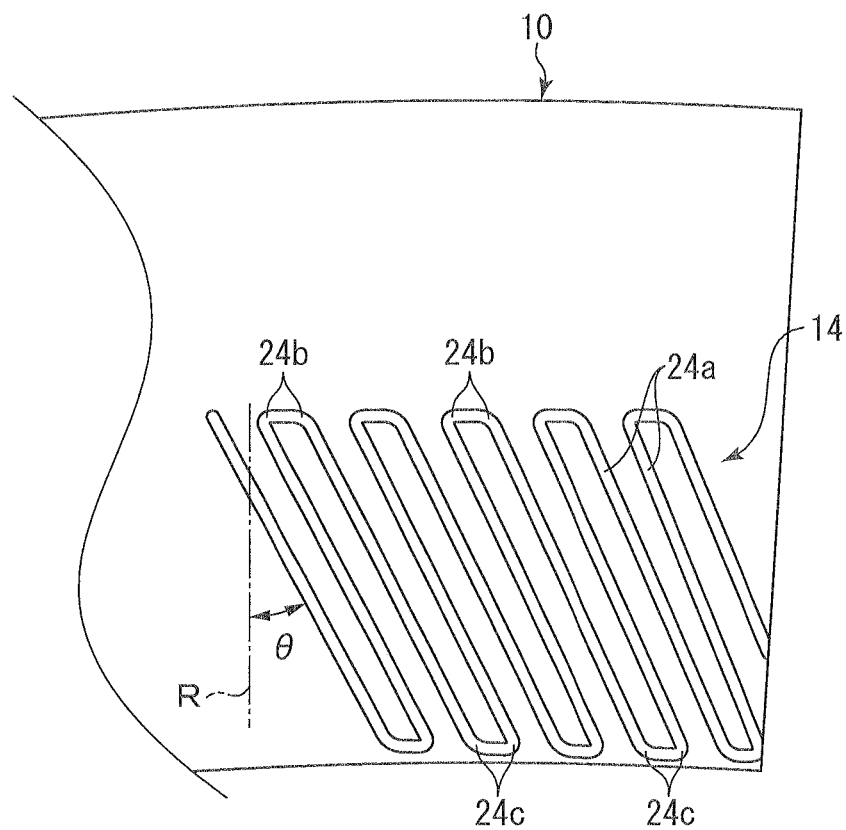

[Fig. 15]
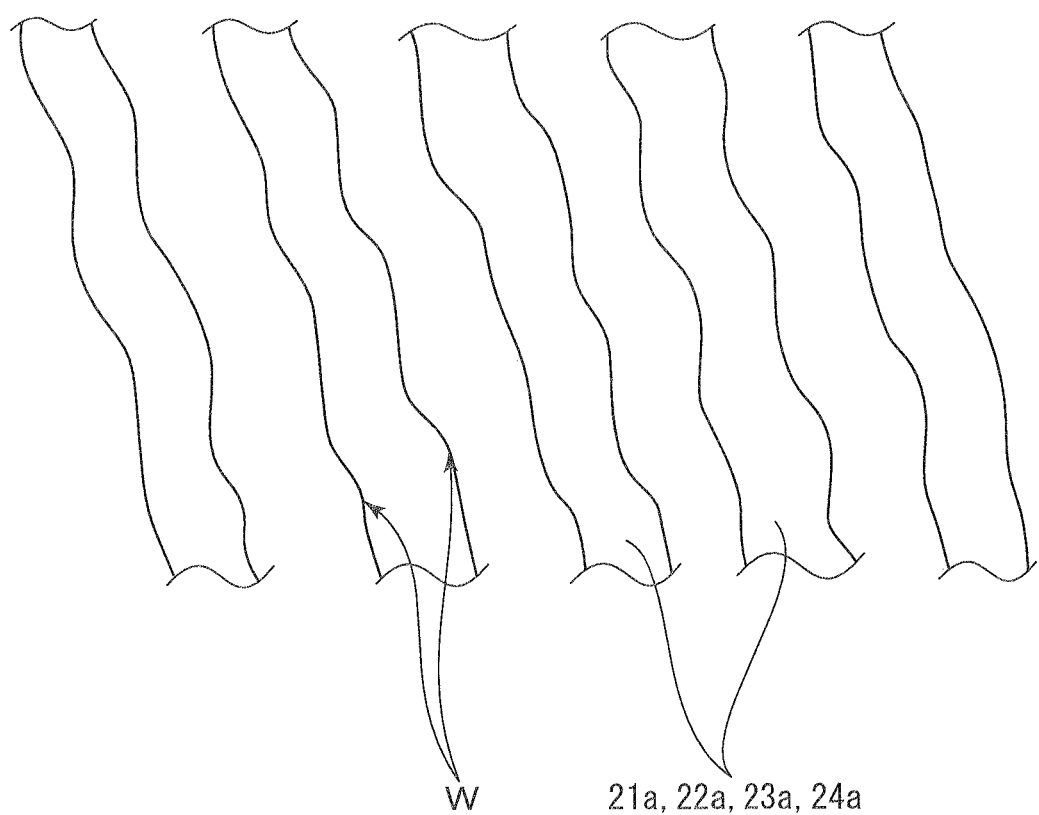
W  21a, 22a, 23a, 24a

SLIDING COMPONENT

CROSS REFERENCE TO RELATED APPLICATIONS

This application is a continuation-in-part of co-pending U.S. application Ser. No. 14/403,519, filed Nov. 24, 2014 as a 371 of PCT/JP2013/073746, filed Sep. 4, 2013, and claiming priority to Japanese patent application JP 2012-199489, filed Sep. 11, 2012, the contents of which are incorporated herein by reference.

TECHNICAL FIELD

The present invention relates to a sliding component suitable for mechanical seals, bearings and other sliding mechanisms, for example. In particular, the present invention relates to a sliding component for seal rings, bearings, etc., that must reduce friction by retaining a fluid on the sealing face and also prevent the fluid from leaking out of the sealing face.

BACKGROUND ART

For a mechanical seal, which is an example of a sliding component, to maintain sealing property for a long period of time, it must satisfy the mutually exclusive conditions of "seal" and "lubricate." Particularly in recent years, the demand for lower friction is increasing further in the area of environmental protection, etc., as a means to prevent the sealed fluid from leaking while reducing mechanical loss at the same time. One way to reduce friction is to generate dynamic pressure between the sealing faces by means of rotation to create the so-called fluid lubrication state where the surfaces slide against each other with a liquid film in between. In this case, however, positive pressure generates between the sealing faces and the fluid flows out of the sealing faces from the part subject to the positive pressure. This is the so-called lateral leak that occurs with bearings and corresponds to how seals leak.

In the case of liquid seals, where the viscosity of the liquid is greater than that of gas, the dynamic pressure effect is achieved between the two surfaces due to their minute undulations and surface irregularities that are present even when both are planes. Accordingly, liquid seal structures are often designed to give priority to sealing performance. On the other hand, however, several mechanisms have been contrived to demonstrate the pumping effect of pulling back the leaked liquid to the high-pressure side in order to seal and lubricate at the same time. For example, Patent Literature 1 discloses an invention which is a rotating ring having several spiral grooves on its shaft seal area in the circumferential direction so as to move the fluid toward the high-pressure chamber.

Also among other inventions relating to a sliding component, one invention is known where a suction means is formed on the sealed-fluid side of the sealing face in order to introduce the sealed fluid to the sealing face, and the sealed fluid thus introduced is stored in two dimples formed on the outer periphery side and inner periphery side of the sealing face in the radial direction and separated by a dam, while being pumped in the dimple on the inner periphery side in the radial direction, so as to prevent leakage of the sealed fluid from the seal area positioned on the inner periphery side of the two dimples in the radial direction (refer to Patent Literature 2).

However, the inventions described in Patent Literatures 1 and 2 above are subject to a pressure difference between the inner periphery and outer periphery of the seal or other sealing face, thus requiring a pumping action to counter the pressure, and are potentially unable to push back the fluid depending on the level of this pressure. This creates the problem of more fluid leaking when the pressure difference is large, although leakage can be prevented when the pressure difference is small.

CITATION LIST

Patent Literature

Patent Literature 1: Japanese Patent Laid-open No. Hei 8-277941 (Page 5, FIG. 6)
Patent Literature 2: Japanese Patent Laid-open No. 2005-180652

SUMMARY OF INVENTION

Technical Problem

When the sealing faces of two parts are each constituted by a smooth surface, as is the case of a general mechanical seal, not only the sealed fluid forms a film between the sealing faces, but it is known that cavitation occurring in the fluid also forms a phase between them (refer to ASME Paper No. 65-Lub-11 by Hamilton, Walowit and Allen (1965)) In other words, a phase constituted by liquid (sealed liquid) (hereinafter referred to as "liquid phase") and another phase constituted by gas (hereinafter referred to as "gas phase") are formed between the sealing faces.

Also, as shown in FIG. 1, it is generally known that a streak-like flow of fluid 20 due to cavitation generates in a dimple or other concaved part 10 formed on the sealing face S.

An object of the present invention is to provide a sliding component that can prevent leakage regardless of the level of differential pressure between the inner periphery and outer periphery of the sealing face by controlling the streak-like flow of fluid due to cavitation that occurs in a dimple or other concaved part (referred to as "dimple" in this Specification) formed on the sealing face.

Principles

The inventors of the present invention gained the knowledge, during the course of research on fluid lubrication action in a dimple on the sealing face of a mechanical seal, etc., that, when grooves 30 with directionality are provided at the bottom of a dimple formed on the sealing face, as shown in FIG. 2, the direction of a streak-like flow of fluid 20 that generates in the area of cavitation occurring in the dimple 10 can be changed or controlled. This is probably explained by the fact that the cavitation is internally filled with gas whose viscosity is sufficiently small compared to that of liquid, and the resulting good fluidity keeps the pressure in the cavitation constant, which in turn acts to control the streak-like flow in the cavitation regardless of the differential pressure between the inner periphery and outer periphery of the sealing face.

In other words, when the grooves 30 with directionality are present at the bottom of the dimple 10, edges 40 of the grooves 30 act upon the gas-liquid interface as geometrical barriers to prevent the movement of the streak-like flow of fluid 20 to pass over the grooves 30, and as a result, the streak-like flow of fluid 20 moves to a certain degree along the edges 40 of the grooves 30 and consequently the streak-like flow inside the cavitation is controlled.

The geometrical barrier action of edges is described in detail in Japanese Patent Laid-open No. 2011-185292, which is an application for patent filed by the same applicant of the present invention.

Solution to Problem

To achieve the aforementioned object, firstly the sliding component proposed by the present invention is characterized in that dimples are provided on one sealing face of a pair of sliding parts that mutually slide relative to each other, and grooves with directionality are provided in a cavitation formation area in each dimple.

According to these features, the streak-like flow of fluid that generates in the dimple due to cavitation can be controlled and thus leakage can be prevented regardless of the level of differential pressure between the inner periphery and outer periphery of the sealing face. To describe this in detail, the cavitation is internally filled with gas whose viscosity is sufficiently low compared to that of liquid, and the resulting good fluidity keeps the pressure in the cavitation constant, which in turn acts to control the streak-like flow in the cavitation regardless of the differential pressure between the inner periphery and outer periphery of the sealing face, and if grooves with directionality are present in the dimple, edges of the grooves act upon the gas-liquid interface as geometrical barriers to prevent the movement of the streak-like flow of fluid to pass over the grooves, and as a result, the streak-like flow of fluid moves to a certain degree along the edges of the grooves and consequently the streak-like flow inside the cavitation is controlled and leakage is prevented.

Furthermore, secondly, the sliding component proposed by the present invention is characterized, in addition to the first features, in that the grooves with directionality are provided at least on the low-pressure fluid side of the cavitation formation area.

According to these features, the control of the streak-like flow of fluid by the grooves with directionality is implemented at least on the low-pressure fluid side of the dimple, which prevents leakage to the low-pressure fluid side.

Furthermore, thirdly, the sliding component proposed by the present invention is characterized, in addition to the first or second features, in that continuous grooves that communicate with the high-pressure fluid side are provided at least in the location other than the cavitation formation area in the dimple.

According to these features, the positive pressure downstream of the dimple is released, which in turn reduces the upstream pressure and makes it easier for cavitation to occur upstream, and consequently the cavitation formation area extends to near the downstream side of the dimple and the direction of the streak-like flow of fluid caused by the cavitation formation area can be controlled much better as a result. In addition, fluid that has flowed into the positive pressure area can be returned to the high-pressure fluid side.

Furthermore, fourthly, the sliding component proposed by the present invention is characterized, in addition to the first or second features, in that the grooves with directionality provided in the cavitation formation area in the dimple are formed in such a way that their directions become symmetrical relative to the sliding direction of the sealing face with reference to the center of the sliding direction of the dimple.

According to these features, the sliding component need not be replaced regardless of whether the rotating direction of the mating sealing face is forward or reverse.

Advantageous Effects of Invention

The present invention offers excellent effects as described below:

(1) Dimples are provided on one sealing face of a pair of sliding parts that mutually slide relative to each other, and grooves with directionality are provided in a cavitation formation area in each dimple, as a result of which the streak-like flow of fluid that generates in the dimple due to cavitation can be controlled, which in turn prevents leakage regardless of the level of differential pressure between the inner periphery and outer periphery of the sealing face.

(2) Grooves with directionality are provided at least on the low-pressure fluid side of the cavitation formation area, as a result of which control of the streak-like flow of fluid by the grooves is implemented at least on the low-pressure fluid side of the dimple, which in turn prevents leakage to the low-pressure fluid side.

(3) Continuous grooves that communicate with the high-pressure fluid side are provided at least in the location other than the cavitation formation area in the dimple, as a result of which the positive pressure downstream of the dimple is released, which in turn reduces the upstream pressure and makes it easier for cavitation to occur upstream, and consequently the cavitation formation area extends to near the downstream side of the dimple and the direction of the streak-like flow of fluid caused by the cavitation formation area can be controlled much better as a result. In addition, fluid that has flowed into the positive pressure area can be returned to the high-pressure fluid side.

(4) Grooves with directionality provided in the cavitation formation area in the dimple are formed in such a way that their directions become symmetrical relative to the sliding direction of the sealing face with reference to the center of the sliding direction of the dimple, as a result of which the sliding component need not be replaced regardless of whether the rotating direction of the mating sealing face is forward or reverse.

BRIEF DESCRIPTION OF DRAWINGS

FIG. 1 is a drawing explaining the streak-like flow of fluid due to cavitation that generates in a dimple formed on the sealing face.

FIG. 2 is a drawing explaining how the direction of the streak-like flow of fluid in the cavitation area that generates in a dimple formed on the sealing face is changed when grooves with directionality are provided at the bottom of the dimple.

FIG. 3 is a longitudinal section view showing an example of a mechanical seal that pertains to an example of the present invention.

FIGS. 4(a) and 4(b) are sealing faces of sliding parts pertaining to Example 1 of the present invention, where the dimple has a quadrilateral shape in FIG. 4(a), while it has a circular shape in FIG. 4(b).

FIG. 5(a) is a drawing explaining a positive-pressure generation mechanism constituted by a narrowing gap (step) on the downstream side of a dimple, while FIG. 5(b) is a drawing explaining a negative-pressure generation mechanism constituted by an expanding gap (step) on the upstream side of a dimple.

FIGS. 6(a) and 6(b) are plan views of key areas showing examples where grooves with directionality are provided at the bottom of the cavitation formation area in the dimple, as it pertains to Example 1 of the present invention.

FIGS. 7(a), 7(b) and 7(c) are plan views of key areas showing examples where continuous grooves that communicate with the high-pressure fluid side, etc., are provided in a location other than the cavitation formation area in the dimple, as it pertains to Example 2 of the present invention.

FIG. 8 is a plan view of key areas showing an example where grooves with directionality as provided in the cavitation formation area in the dimple are formed symmetrical to the sliding direction of the sealing face with reference to the center of the sliding direction of the dimple, as it pertains to Example 3 of the present invention.

FIG. 9 is a schematic plan view illustrating an essential portion of Example 4 of the present invention.

FIG. 10 is a schematic perspective illustrating a method of forming grooves with directionality, first projecting grooves, and second projecting grooves, which are shown in FIG. 9.

FIG. 11(a) is an enlarged plan view illustrating an essential portion of a first example of Example 4 shown in FIG. 9, FIG. 11(b) is an enlarged plan view of an area J shown in FIG. 11(a), while FIG. 11(c) is an enlarged sectional view taken along a direction of arrow E-E in FIG. 11(b).

FIG. 12(a) is an enlarged plan view illustrating an essential portion of a second example of Example 4 shown in FIG. 9, FIG. 12(b) is an enlarged plan view of an area K shown in FIG. 12(a), while FIG. 12(c) is an enlarged sectional view taken along a direction of arrow F-F in FIG. 12(b).

FIG. 13 is an enlarged plan view illustrating an essential portion of a third example of Example 4 shown in FIG. 9

FIG. 14 is an enlarged plan view illustrating an essential portion of a fourth example of Example 4 shown in FIG. 9.

FIG. 15 is an enlarged plan view illustrating an essential portion of an example in which an irregularity is formed on a sidewall of the grooves with directionality shown in any of FIG. 11 to FIG. 14.

DESCRIPTION OF EMBODIMENTS

Modes for carrying out the present invention are explained below based on examples. It should be noted, however, that, unless otherwise specified expressly, the dimensions, materials, shapes, and relative arrangements, etc., of the components described in these examples are not intended to limit the scope of the present invention to these dimensions, materials, shapes, and relative arrangements, etc.

Example 1

The sliding component pertaining to Example 1 of the present invention is explained by referring to FIGS. 3 to 6.

It should be noted that, in this example, the sliding component represents a part that constitutes a mechanical seal.

FIG. 3 is a longitudinal section view showing an example of a mechanical seal, where the mechanical seal is of the inside type that seals the fluid on the high-pressure fluid side that tends to flow in the direction from the outer periphery to inner periphery of the sealing face, comprising: an annular rotating ring 3 provided, on a rotational axis 1 that drives a pump impeller (not illustrated) on the high-pressure fluid side, via a sleeve 2 in a manner rotatable integrally with the rotational axis 1; and an annular stationary ring 5 provided on a housing 4 of the pump in a manner not rotatable but movable in the axial direction; with the two rings sliding relatively in a manner contacting each other via their sealing faces S that have been mirror-surface-finished by lapping, etc., by means of a coiled wave spring 6 and bellows 7 biasing the stationary ring 5 in the axial direction. In other words, this mechanical seal prevents flow-out of the sealed fluid toward the atmosphere side from the outer periphery of the rotational shaft 1, using the sealing faces S of the rotating ring 3 and stationary ring 5.

FIG. 4 shows the sealing faces of sliding parts pertaining to Example 1 of the present invention, explaining examples where a dimple is formed on the sealing face of the stationary ring 5 in FIG. 3.

In FIG. 4(a), multiple quadrilateral dimples 10 are provided on the sealing face S in the circumferential direction. The dimples do not communicate with the high-pressure fluid side or low-pressure fluid side, and the respective dimples 10 are provided independent of one another. The number of dimples 10 and their area and depth are set to optimal values according to the diameter and surface width of the stationary ring 5, differential pressure between the high-pressure fluid side and low-pressure fluid side, and other conditions, but preferably the dimples have a large area and shallow depth from the viewpoints of fluid lubrication action and formation of liquid film.

Note that in FIG. 4(a), the dimples 10 are shaped in such a way that their two sides, namely the inner diameter side and outer diameter side, form arcs whose center corresponds to the center of the stationary ring 5, with the remaining two sides in the circumferential direction, namely the upstream side and downstream side, comprised of straight lines; however, they can have any other shape such as rectangle, square or polygon.

In FIG. 4(b), multiple dimples 11 having a circular shape are provided in the circumferential direction. Just like in FIG. 4(a), the dimples 11 do not communicate with the high-pressure fluid side or low-pressure fluid side and the respective dimples 11 are provided independent of one another. Preferably the dimples 11 have a large diameter and are shallow, but because the size and depth of dimples 11 vary depending on the viscosity of the fluid as well as its actuation speed and film pressure and must thus be designed in consideration of various conditions in a comprehensive manner, it is difficult to determine the dimple size and depth in uniform ways.

Now, the positive-pressure generation mechanism and negative-pressure generation mechanism are explained by referring to FIG. 5 under the assumption that dimples conforming to the present invention are provided.

In FIG. 5(a), the rotating ring 3 moves in a rotational manner relative to the stationary ring 5 in the counterclockwise direction, as shown by the arrow, but if dimples 10, 11 are formed on the sealing face S of the stationary ring 5, a narrowing gap (step) 12 exists on the downstream side of each of the dimples 10, 11. The sealing face of the mating rotating ring 3 is flat.

As the rotating ring 3 moves relatively in the direction shown by the arrow, the fluid present between the sealing faces of the rotating ring 3 and stationary ring 5 tends, because of its viscous property, to follow the rotating ring 3 by moving in the moving direction of the rotating ring 3, and when this occurs, the dynamic pressure (positive pressure) shown by the broken line generates due to the presence of the narrowing gap (step) 12.

In FIG. 5(b), the rotating ring 3 moves in a rotational manner relative to the stationary ring 5 in the counterclockwise direction, as shown by the arrow, but when dimples 10, 11 are formed on the sealing face S of the stationary ring 5, an expanding gap (step) 13 exists on the upstream side of each of the dimples 10, 11. The sealing face of the mating rotating ring 3 is flat.

As the rotating ring 3 moves relatively in the direction shown by the arrow, the fluid present between the sealing faces of the rotating ring 3 and stationary ring 5 tends, because of its viscous property, to follow the rotating ring 3 by moving in the moving direction of the rotating ring 3, and when this occurs, the dynamic pressure (negative pressure) shown by the broken line generates due to the presence of the expanding gap (step) 13.

Accordingly, negative pressure generates on the upstream side of the dimples 10, 11, while positive pressure generates on the downstream side, and cavitation occurs in the negative-pressure generation area on the upstream side.

FIG. 6 is a plan view of key areas showing an example where grooves with directionality are provided at the bottom of the cavitation formation area in the dimple.

The sealing face S of the stationary ring 5 has multiple quadrilateral dimples 10 provided on it in the circumferential direction, where the dimples 10 do not communicate with the high-pressure fluid side or low-pressure fluid side and the respective dimples 10 are provided independent of one another.

As the sealing face of the mating side (sealing face of the rotating ring 3) moves in a rotational manner relative to the stationary ring 5 in the counterclockwise direction, cavitation occurs on the upstream side of the dimple 10 and a cavitation area denoted by 14 is formed (hereinafter referred to as "cavitation formation area 14"). Also, grooves 15 with directionality are provided in the cavitation formation area 14 in the dimple 10. The grooves 15 with directionality may be provided over the entire cavitation formation area 14 or in some parts thereof. Furthermore, the grooves 15 with directionality are formed at the bottom of the dimple 10 and their width and depth are not specifically limited, so long as the edges of the grooves 15 with directionality act upon the gas-liquid interface as geometrical barriers to prevent the movement of the streak-like flow of fluid to pass over the grooves 15 with directionality, as explained in the earlier section of "Means for Solving the Problems {Principles}."

In addition, the directionality of grooves 15 is determined by how the fluid should be controlled and, in FIG. 6, they are inclined in the counterclockwise direction from the inner diameter side toward the outer diameter side so as to push back the fluid in the dimple 10 to the high-pressure fluid side and thereby prevent it from leaking to the low-pressure fluid side. As explained earlier, the cavitation is internally filled with gas whose viscosity is sufficiently low compared to that of liquid, and the resulting good fluidity keeps the pressure in the cavitation constant, which in turn acts to control the streak-like flow regardless of the differential pressure between the inner periphery and outer periphery of the sealing face S, and therefore when the grooves 15 have the directionality as shown in FIG. 6, the grooves 15 provided in the cavitation formation area 14 cause the streak-like flow of fluid in the dimple 10 to move to a certain degree along the edges of the first groove 15 on the upstream side, and then move to a certain degree along the edges of the second groove 15, and as this is repeated in succession, the fluid is controlled in a manner pushed back to the high-pressure fluid side as shown by the double lines.

It should be noted that the pitch p of the grooves 15 with directionality only needs to be set to an optimal value from design viewpoints and is not limited in any way.

While the grooves 15 with directionality shown in FIG. 6(a) are provided over the entire area from the low-pressure fluid side to high-pressure fluid side of the dimple 10 in the radial direction, those shown in FIG. 6(b) are provided only on the low-pressure fluid side. In FIG. 6(a), the control of the streak-like flow of fluid by the grooves 15 with directionality is implemented over the entire area from the low-pressure fluid side to high-pressure fluid side of the dimple 10 in the radial direction, while in FIG. 6(b), the control of the streak-like flow of fluid by the grooves 15 with directionality is implemented on the low-pressure fluid side of the dimple 10. When the differential pressure between the low-pressure fluid side and high-pressure fluid side is large, preferably the grooves 15 with directionality are provided over the entire area from the low-pressure fluid side to the high-pressure fluid side in the radial direction, as shown in FIG. 6(a), but when the differential pressure between the low-pressure fluid side and high-pressure fluid side is small, leakage is prevented even if the grooves 15 with directionality are provided only on the low-pressure fluid side, as shown in FIG. 6(b).

It should be noted that, besides only on the low-pressure fluid side, the grooves 15 with directionality may be provided only on the high-pressure fluid side or only at the center in the radial direction, which means that, in essence, the area or areas where the grooves 15 with directionality are to be provided can be selected as deemed appropriate according to the level of differential pressure, etc.

Example 2

FIG. 7 is a plan view of key areas showing an example where continuous grooves that communicate with the high-pressure fluid side, etc., are provided in a location other than the cavitation formation area in the dimple, as it pertains to Example 2 of the present invention.

It should be noted that, in FIG. 7, the symbols corresponding to those used in the first embodiment indicate the same members denoted by them in Example 1, and duplicate explanations are omitted.

In FIG. 7(a), the cavitation formation area 14 is formed on the upstream side in the dimple 10, while dynamic pressure generates and a positive pressure area 16 is formed in another location or specifically on the downstream side. And, continuous grooves 17 that communicate with the high-pressure fluid side are provided in the positive pressure area 16. The continuous grooves 17 are as deep as or deeper than the concaved dimples 10. Also, the continuous grooves 17 are wide enough to release the positive pressure.

When the continuous grooves 17 that communicate with the high-pressure fluid side are provided in the positive pressure area 16 on the downstream side of the dimple 10, the positive pressure on the downstream side of the dimple 10 is released and thus the pressure on the upstream side decreases, and consequently cavitation occurs more easily on the upstream side. Accordingly, the cavitation formation area 14 extends to near the downstream side of the dimple 10 and the direction of the streak-like flow of fluid due to the cavitation formation area 14 can be controlled much better as a result. Also, fluid that has flowed into the positive pressure area 16 can be returned to the high-pressure fluid side.

In FIG. 7(b), continuous grooves 18 of reverse-L shape that communicate with the high-pressure fluid side are provided in the positive pressure area 16. These reverse-L shaped continuous grooves 18 also communicate with parts of the downstream side of the cavitation formation area 14 in addition to the positive pressure area 16. Accordingly, the positive pressure on the downstream side of the dimple 10 is released more and the direction of the streak-like flow of fluid due to the cavitation formation area 14 can be controlled much better as a result. Also, fluid that has flowed in and travelled to near the downstream side of the cavitation formation area 14 and fluid that has flowed into the positive pressure area 16 can be returned to the high-pressure fluid side.

In FIG. 7(c), continuous grooves 17 that communicate with the high-pressure fluid side and continuous grooves 19 that communicate with the low-pressure fluid side are provided in the positive pressure area 16. Accordingly, the positive pressure on the downstream side of the dimple 10 is released to pressure near the pressure on the low-pressure side and the direction of the streak-like flow of fluid due to the cavitation formation area 14 can be controlled much better as a result.

It should be noted that, while fluid that has flowed into the positive pressure area 16 is easily let flow to the low-pressure fluid side, which seems not desirable as it may cause leakage when this example is applied to a seal device, this example can still be applied to sliding parts in general including bearings because some degree of leakage should be permitted in the case of bearings, etc., and their lubrication performance is expected to improve as a result of applying this example.

Example 3

FIG. 8 is a plan view of key areas showing an example where grooves with directionality provided in the cavitation formation area in the dimple are formed symmetrical relative to the sliding direction of the sealing face with reference to the center of the sliding direction of the dimple, as it pertains to Example 3 of the present invention.

It should be noted that, in FIG. 8, the symbols corresponding to those used in the first embodiment indicate the same members denoted by them in Example 1, and duplicate explanations are omitted.

While the sliding parts shown in Examples 1 and 2 can be applied only when they rotate in one direction, Example 3 can be applied when they rotate in two different directions.

In FIG. 8, grooves 15, 15' with directionality provided in the cavitation formation area in the dimple 10 are formed in such a way that their directions become symmetrical relative to the sliding direction of the sealing face over the radius line O-O passing through the center of the sliding direction of the dimple 10. In FIGS. 6 and 7, the cavitation formation area 14 is set in such a way that it extends over more than a half of the dimple 10 from its upstream side, but in FIG. 8, the cavitation formation area 14 is set in such a way that it extends only over approximately half of the dimple 10 from its upstream side, and even when the rotating direction of the mating sealing face reverses to the clockwise direction, the cavitation formation area 14 still extends over approximately half of the dimple 10 from its upstream side. For example, one way to do this is to increase the length of the dimple 10 in the circumferential direction or make the dimple 10 shallower so that the formed negative-pressure generation area becomes shorter in the circumferential direction. In addition, even if the formed cavitation formation area 14 extends to the downstream side of the radius line O-O, the streak-like flow of fluid remains controlled in the outer radial direction on the upstream side and does not pass over the grooves 15' whose directionality is opposite that on the downstream side, and consequently the control of the streak-like flow of fluid is not affected and desired control can be implemented.

In the case of FIG. 8, the cavitation formation area 14 is formed over approximately half of the dimple 10 from its upstream side, while the positive pressure area 16 is formed over approximately half of it from its downstream side, so that the grooves 15 with directionality in the cavitation formation area 14 act upon the streak-like flow of fluid in a manner directing it to the high-pressure fluid side, while the grooves 15' with directionality in the positive pressure area 16 act upon the streak-like flow of fluid in a manner directing it to the low-pressure fluid side, which may lead to a tendency to leak. In the case of this example, however, fluid is controlled to travel to the high-pressure fluid side in the cavitation formation area 14, and the amount of fluid that flows into the positive pressure area 16 is small and pressure does not increase, and therefore should some fluid travel to the low-pressure fluid side, it would be sealed by the sealing face S before reaching the low-pressure fluid side and therefore leakage should not occur.

The foregoing explained the examples of the present invention using the drawings, but specific constitutions of the present invention are not limited to these examples and other changes and additions are also included in the scope of the present invention so long as they do not deviate from the key points of the present invention.

For example, while the aforementioned examples explained using the sliding component as one of the pair of rotating seal ring and stationary seal ring in a mechanical seal device, but it is also possible to use it as a sliding component for a bearing that slides against a rotating axis with lubrication oil sealed on one side of its cylindrical sealing face in the axial direction.

In addition, the aforementioned examples explained situations where high-pressure fluid is sealed on the outer periphery side, for example, but the present invention can also be applied when high-pressure fluid is present on the inner periphery side, in which case the grooves with directionality only need to be provided in the opposite directions.

Furthermore, while the aforementioned examples primarily explained situations where the dimple has a quadrilateral shape, the shape of the dimple is not limited to quadrilateral and it can also be circular, oval or polygonal.

Example 4

FIG. 9 to FIG. 15 show a sliding component of Example 4 according to the present invention. Example 4 will be described below by referring to these FIG. 9 to FIG. 15. Note that, in order to avoid duplicated explanation in Example 4, the same components of Example 4 as those of the aforementioned Examples are expressed by the same reference numerals and descriptions thereof are omitted.

In FIG. 9, multiple dimples 10 are formed on a sealing face S of a stationary ring 5, and grooves 21a, 22a, 23a, or 24a with directionality, described in detail below, is arranged in a cavitation formation area 14 in each dimple 10 so as to be located at the substantially same position as the grooves 15 with directionality shown in FIG. 6(b). End portions of the grooves 21a to 24a with directionality are connected respectively to first projecting grooves 21b to 24b on one ends and second projecting grooves 21c to 24c on the other ends as shown in FIG. 11 to FIG. 14.

First, a method of producing the stationary ring 5 will be described before explaining details of the grooves 21a to 24a with directionality, the first projecting grooves 21b to 24b, and the second projecting grooves 21c to 24c in order to facilitate the understanding of characteristics of these grooves.

The method of producing the stationary ring 5 includes at least a first step and a second step, which will be described below.

First, an annular member is previously processed so as to have a cross-sectional shape of the stationary ring 5 as shown in FIG. 3, and one end surface of the annular member is subjected to lapping and polishing to form a smooth surface.

Next, in the first step, the smooth surface of the annular member prepared by lapping and polishing as described above is irradiated with a laser so as to form the multiple dimples 10 on the sealing face S of the stationary ring 5 in a circumference direction as shown in FIG. 4.

After the first step described above, in the second step, a bottom of the dimple 10 is scanned with a laser beam 61 outputted from a laser head 60 so as to draw a single path 50 as shown in FIG. 10, so that the grooves 21a to 24a with directionality, the first projecting grooves 21b to 24b, and the second projecting grooves 21c to 24c are formed.

The path 50 includes a plurality of main path portions 50a corresponding to the grooves 21a to 24a with directionality and a plurality of turn-around path portions 50b, 50c arranged in a staggered shape at one end sides and the other end sides of the main path portions 50a. The path 50 is configured by alternately connecting the plurality of the main path portions 50a and the plurality of the turn-around path portions 50b, 50c. Further, the path 50 may be formed continuously over the entire length of the path 50 or partly discontinuously formed at a plurality of places. Such a difference is based on which of the first projecting grooves 21b to 24b and the second projecting grooves 21c to 24c are formed.

The scanning of the laser beam 61 described above may be achieved by moving the laser head 60 while fixing a position of the dimple 10, or, conversely, by moving the dimple 10 while fixing a position of the laser head 60. Further, if necessary, the scanning may be performed by moving both the dimple 10 and the laser head 60. In any case, as shown in FIG. 10, a production method in which the scanning is performed in a single stroke of the laser beam 61 is excellent in productivity, however, the bottom of the dimple 10 is scraped off by the laser beam 61 in the turn-around path portions 50b, 50c on opposite sides of the main path portions 50a. The turn-around path portions 50b, 50c are extremely short as compared to lengths of the main path portions 50a, thus, basically, the turn-around path portions 50b, 50c hardly affect a streak-like flow of fluid.

Further, in the main path portions 50a, the scanning by the laser beam 61 can be stably performed at a relatively high speed, thus groove formed in the main path portions 50a by the laser beam 61 have small variations in dimension of a processed surface and a cross section. As a result, the grooves are formed in a relatively smooth and stable shape.

However, the scanning by the laser beam 61 is relatively slow in the turn-around path portions 50b, 50c, and, further, the speed of the laser beam 61 tends to become unstable. Thus, the grooves formed in the turn-around path portions 50b, 50c are likely to have larger widths and depths than those formed in the main path portions 50a, which causes a problem such as greatly affecting a streak-like flow of fluid in the dimple 10. The sliding component and the production method of the same shown in the present Embodiment is in accordance with inventions devised to provide a solution to this problem.

Next, the grooves 21a with directionality, the first projecting grooves 21b, and the second projecting grooves 21c, according to a first example of the present Example, will be described below by referring to FIG. 11(a) to FIG. 11(c).

As shown in FIG. 11(a) to FIG. 11(c), the grooves 21a with directionality, a plurality of pairs of the first projecting grooves 21b positioned on an outer periphery side of the grooves 21a with directionality, and a plurality of pairs of the second projecting grooves 21c positioned on an inner periphery side of the grooves 21a with directionality are formed in the dimple 10. In the present Example, the outer periphery side and the inner periphery side of the grooves 21a with directionality refer to a high-pressure fluid side and a low-pressure fluid side, respectively. However, the present invention is not limited thereto, and such a relationship may be optionally the reverse of that of the present Example. As shown in FIG. 11(a), the grooves 21a with directionality are arranged parallel with each other so as to extend in a direction forming a predetermined angle θ with a dashed line R representing a radial direction of the stationary ring 5. The predetermined angle θ is preferably in a rage of 0°<θ<45°, however, the present invention is not limited thereto and the predetermined angle θ may be set so as to appropriately control a streak-like flow of fluid.

Each of the plurality of pairs of the first projecting grooves 21b includes two first projecting grooves 21b that are connected to and extending from one ends of adjoining two of the grooves 21a with directionality in a direction in which the two first projecting grooves 21b approach each other. Each of the plurality of pairs of the second projecting grooves 21c includes two second projecting grooves 21c that are connected to and extending from the other ends of adjoining two of the grooves 21a with directionality in a direction in which the two second projecting grooves 21c approach each other. As shown in FIG. 11(a), the plurality of pairs of the first projecting grooves 21b and the plurality of pairs of the second projecting grooves 21c are arranged in a staggered shape.

In other words, the plurality of pairs of the first projecting grooves 21b and the plurality of pairs of the second projecting grooves 21c are alternately connected to the grooves 21a with directionality to be like one continuous groove in a staggered shape or meandering shape.

When the grooves 21a with directionality, the first projecting grooves 21b, and the second projecting grooves 21c, which are shown in FIG. 11(a), are formed, the laser beam 61 shown in FIG. 10 is controlled such that an output of the laser beam 61 in the turn-around path portions 50b, 50c is smaller than that in the main path portions 50a. Specifically, the laser beam 61 is controlled such that the output of the laser beam 61 is gradually reduced when the laser beam 61 is moved from the main path portion 50a to the turn-around path portion 50b or 50c for scanning, set to approximately zero at or near the center of the turn-around path portion 50b or 50c, and then gradually increased to the original output level by the time when the laser beam 61 is moved to the main path portion 50a for scanning.

As a result of the output control of the laser beam 61 performed in this manner, in each of the plurality of pairs of the first projecting grooves 21b, the paired first projecting grooves 21b are spaced apart from each other by the bottom 10a of the dimple 10 as shown in FIG. 11(b) and FIG. 11(c). Similarly, in each of the plurality of pairs of the second projecting grooves 21c, the paired second projecting grooves 21c are spaced apart from each other by the bottom 10a of the dimple 10.

Further, as shown in FIG. 11(b), a width of each first projecting groove 21b becomes smaller towards the tip of the first projecting groove 21b and, as shown in FIG. 11(c), a depth of each first projecting groove 21b becomes smaller towards the tip of the first projecting groove 21b. Although not illustrated, a width and depth of each second projecting groove 21c also become smaller towards the tip of the second projecting groove 21c as the case with the first projecting groove 21b.

The first projecting grooves 21b and the second projecting grooves 21c are formed so as to be projected from the end-portions of the grooves 21a with directionality that are formed as described above. However, the projecting grooves forming a pair are spaced apart from each other, thus the adjacent grooves 21a with directionality are brought into a non-communicated state, which can reduce an influence on a streak-like flow of fluid.

Further, the widths and depths of the first projecting grooves 21b and the second projecting grooves 21c become smaller towards the tips thereof. This can further reduce an influence on a streak-like flow of fluid.

Next, the grooves 22a with directionality, the first projecting grooves 22b, and the second projecting grooves 22c, according to a second example of the present Example, will be described below by referring to FIG. 12(a) to FIG. 12(c). In order to avoid overlap description, the description mainly focuses on the differences from the first example.

As shown in FIG. 12(a) to FIG. 12(c), the dimple 10 includes in its inside the grooves 22a with directionality, a plurality of pairs of the first projecting grooves 22b positioned on an outer periphery side of the grooves 22a with directionality, and a plurality of pairs of the second projecting grooves 22c positioned on an inner periphery side of the grooves 22a with directionality.

When the grooves 22a with directionality, the first projecting grooves 22b, and the second projecting grooves 22c are formed, the laser beam 61 is controlled such that the output of the laser beam 61 is gradually reduced when the scanning of the laser beam 61 shown in FIG. 10 is moved from the main path portion 50a to the turn-around path portion 50b or 50c, set to a minimum level at or near the center of the turn-around path portion 50b or 50c, and then gradually increased to the original output level by the time when the scanning of the laser beam 61 is moved to the main path portion 50a. Note that the output of the laser beam 61 at or near the center of the turn-around path portions 50b, 50c is maintained to a level required for scraping off the bottom of the dimple 10 to a certain depth instead of being reduced to zero.

As a result of the output control of the laser beam 61 performed in this manner, in each of the plurality of pairs of the first projecting grooves 22b, the paired first projecting grooves 22b are connected to each other as shown in FIG. 12(b) and FIG. 12(c). Similarly, in each of the plurality of pairs of the second projecting grooves 22c, the paired second projecting grooves 22c are connected to each other.

Each pair of the first projecting grooves 22b connected to each other includes a portion 22bz that has a width smaller than that of the groove 22a with directionality as shown in FIG. 12(b) and a depth smaller than that of the groove 22a with directionality as shown in FIG. 12(c).

Although not illustrated, similarly, each pair of the second projecting grooves 22c connected to each other also includes a portion that has a width smaller than that of the groove 22a with directionality and a depth smaller than that of the groove 22a with directionality.

As described above, the first projecting grooves 22b and the second projecting grooves 22c are projected from the end portions of the grooves 22a with directionality, and the first projecting grooves 22b forming a pair are connected to each other and the second projecting grooves 22c forming a pair are connected to each other. However, the connected projecting grooves 22b, 22c include the respective portions where the depths and the widths become smaller towards the center of the connected grooves, thereby enabling to reduce an influence on a streak-like flow of fluid. Further, when the first projecting grooves 22b and the second projecting grooves 22c are formed, the output of the laser beam 61 does not need to be zero in the turn-around path portions 50b, 50c. This can eliminate a malfunction caused by excessive output fluctuation associated with an on/off operation of the laser beam 61.

Next, the grooves 23a with directionality, the first projecting grooves 23b, and the second projecting grooves 23c, according to a third example of the present Example, will be described below by referring to FIG. 13. In order to avoid overlap description, the description mainly focuses on the differences from the first example and the second example.

As shown in FIG. 13, the dimple 10 includes in its inside the grooves 23a with directionality, a plurality of pairs of the first projecting grooves 23b positioned on an outer periphery side of the grooves 23a with directionality, and a plurality of pairs of the second projecting grooves 23c positioned on an inner periphery side of the grooves 23a with directionality.

The plurality of pairs of the first projecting grooves 23b include at least one pair of first projecting grooves 23bx composed of the first projecting grooves 23b spaced apart from each other, and at least one pair of first projecting grooves 23by composed of the first projecting grooves 23b connected to each other. Similarly, the plurality of pairs of the second projecting grooves 23c include at least one pair of second projecting grooves 23cx composed of the second projecting grooves 23c spaced apart from each other, and at least one pair of second projecting grooves 23cy composed of the second projecting grooves 23c connected to each other. That is, the third example represents an example in which the first projecting grooves 23b and the second projecting grooves 23c include the pairs of the first projecting grooves 21b and the pairs of the second projecting grooves 21c according to the first example shown in FIG. 11(a) to FIG. 11(c) and the pairs of the first projecting grooves 22b and the pairs of the second projecting grooves 22c according to the second example shown in FIG. 12(a) to FIG. 12(c), which are present at random.

The first projecting grooves 23b and the second projecting grooves 23c formed as described above are configured to randomly include the aforementioned projecting grooves spaced apart from each other and projecting grooves connected to each other. This means that, when the output of the laser beam 61 shown in FIG. 10 is reduced in the turn-around path portions 50b, 50c, the output of the laser beam 61 can be reduced to near zero without requiring a high precision control. That is, a malfunction such as an unstable output associated with an on/off operation of the laser beam 61 can be eliminated while the projecting grooves forming a pair are substantially spaced apart from each other. Thus, a nearly identical effect as the first example shown in FIG. 11(a) to FIG. 11(c) and a nearly identical effect as the second example shown in FIG. 12(a) to FIG. 12(c) can be both achieved.

Forming the first projecting grooves 21b to 23b and the second projecting grooves 21c to 23c of the first example to the third example by the laser beam 61 in the manner described above carries a benefit such as facilitating a scanning speed control of the laser beam 61. Specifically, the laser beam 61 moves in a nearly fixed direction at a relatively high speed when scanning the main path portion 50a, however the laser beam 61 needs to be turned around by 180° in a very short distance in the turn-around path portions 50b, 50c. It is difficult to achieve a high precision scanning speed control of the laser beam 61 when it is turned around by 180°. However, in the first example to the third example, the laser beam 61 is only needed to reduce the output to zero or a low level without requiring a special scanning speed control at the time of direction change by 180°, thereby enabling to facilitate the scanning speed control of the laser beam 61.

Next, the grooves 24a with directionality, the first projecting grooves 24b, and the second projecting grooves 24c, according to a fourth example of the present Example, will be described below by referring to FIG. 14. In order to avoid overlap description, the description mainly focuses on the differences from the first to third examples.

As shown in FIG. 14, the dimple 10 includes in its inside the grooves 24a with directionality, a plurality of pairs of the first projecting grooves 24b positioned on an outer periphery side of the grooves 24a with directionality, and a plurality of pairs of the second projecting grooves 24c positioned on an inner periphery side of the grooves 24a with directionality.

In each of the plurality of pairs of the first projecting grooves 24b, the paired first projecting grooves 24b are connected to each other. Similarly, in each of the plurality of pairs of the second projecting grooves 24c, the paired second projecting grooves 24c are connected to each other.

The grooves 24a with directionality, the first projecting grooves 24b, and the second projecting grooves 24c according to the fourth example can be formed simply by reducing the scanning speed of the laser beam 61 shown in FIG. 10 in the main path portions 50a to a relatively low speed, substantially equal to that in the turn-around path portions 50b, 50c. Thus, an effect such as eliminating the necessity of a special output control of the laser beam 61 in the turn-around path portions 50b, 50c can be expected. Needless to say, the fourth example can also exert a similar effect to the above-described basic effect of the grooves with directionality.

In FIG. 11 to FIG. 14, side walls of the grooves 21a to 24a with directionality are shown as flat surfaces, however, the output and the scanning speed of the laser beam 61 may be intentionally controlled such that at least a part of the side wall of any of the grooves 21a to 24a with directionality exhibits an irregularity or unevenness W in a plan view as shown in FIG. 15. Further, although an illustration and description are omitted, needless to say, the irregularity may be also intentionally formed on side walls of the first projecting grooves 21b to 24b and the second projecting grooves 21c to 24c without departing from the scope of the present invention.

The aforementioned grooves 21a to 24a with directionality having the irregularities in the side walls are formed simply by slightly changing the output of the laser beam 61. On the other hand, when the laser beam 61 originally exhibits a certain level of fluctuation in output due to the accuracy of the output control, the grooves 21a to 24a with directionality may be formed without requiring a special output control. Further, the grooves 21a to 24a with directionality may be formed while changing the scanning speed of the laser beam 61. Needless to say, the grooves 21a to 24a with directionality may be formed while changing both the output and the scanning speed of the laser beam 61.

When the side walls of the grooves 21a to 24a with directionality are formed so as to have the irregularities W in a plan view in this manner, the irregularities W impart resistance to flows along longitudinal directions of the grooves 21a to 24a with directionality. However, a positive pressure generated by such resistance can promote a flow moving from one groove with directionality to the adjacent groove with directionality.

Note that the sliding component according to the present invention is not limited to the fourth embodiment shown in FIG. 9 to FIG. 15 and, needless to say, other variations within a range not departing from the scope of the present invention are also included in the present invention.

REFERENCE SIGNS LIST

1 Rotational axis
2 Sleeve
3 Rotating ring
4 Housing
5 Stationary ring
6 Coiled wave spring
7 Bellows
10 Dimple
10a Dimple bottom
11 Dimple
12 Rayleigh step
13 Reverse Rayleigh step
14 Cavitation formation area
15 Groove with directionality
15' Groove with directionality
16 Positive pressure area
17 Continuous groove
18 Continuous groove
19 Continuous groove
20 Fluid flow
21a-24a Grooves with directionality
21b-24b First projecting grooves
21c-24c Second projecting grooves
22bz Groove portion
23bx Groove portion
23by Groove portion
23cx Groove portion
23cy Groove portion
30 Grooves
40 Edges
50 Path
50a Main path portion
50b, 50c Turn-around path portions
60 Laser head
61 Laser beam

The invention claimed is:
1. A sliding component comprising:
a dimple provided on one sealing face of a pair of sliding parts that mutually slide relative to each other;
grooves with directionality provided in a cavitation formation area in the dimple, the grooves with directionality being formed by scanning a bottom of the dimple with a laser beam;
a plurality of pairs of first projecting grooves provided in the dimple, each of the pairs of the first projecting grooves including the two first projecting grooves that are connected to first side ends of adjoining two of the grooves with directionality and extend from the first side ends in a direction in which the two first projecting grooves approach each other; and a plurality of pairs of second projecting grooves provided in the dimple, each of the pairs of the second projecting grooves including the two second projecting grooves that are connected to second side ends of adjoining two of the grooves with directionality and extend from the second side ends in a direction in which the two second projecting grooves approach each other; and the pairs of the first projecting grooves and the pairs of the second projecting grooves being arranged in a staggered shape.

2. The sliding component according to claim 1, wherein, in at least one pair of the pairs of the first projecting grooves and the pairs of the second projecting grooves, the projecting grooves forming the pair are spaced apart from each other.

3. The sliding component according to claim 2, wherein, in the pair of the projecting grooves spaced apart from each other, a depth of each projecting groove becomes smaller towards a tip of the projecting groove.

4. The sliding component according to claim 2, wherein, in the pair of the projecting grooves spaced apart from each other, a width of each projecting groove becomes smaller towards the tip of the projecting groove.

5. The sliding component according to claim 2, wherein, in each pair of the pairs of the first projecting grooves and the pairs of the second projecting grooves, the projecting grooves forming the pair are spaced apart from each other.

6. The sliding component according to claim 1, wherein, in at least one pair of the pairs of the first projecting grooves and the pairs of the second projecting grooves, the projecting grooves forming the pair are connected to each other.

7. The sliding component according to claim 6, wherein the pair of the projecting grooves connected to each other has a portion of which depth is smaller than that of the groove with directionality.

8. The sliding component according to claim 6, wherein the pair of the projecting grooves connected to each other has a portion of which width is smaller than that of the groove with directionality.

9. The sliding component according to claim 6, wherein, in each pair of the pairs of the first projecting grooves and the pairs of the second projecting grooves, the projecting grooves forming the pair are connected to each other.

10. The sliding component according to claim 1, wherein at least a part of a side wall of any of the grooves with directionality, the first projecting grooves, and the second projecting grooves includes an irregularity in a plan view.

11. A method of producing a sliding component including a sealing face having a dimple and grooves with directionality provided in a cavitation formation area in the dimple, the method comprising:
    a first step of forming the dimple by irradiating one end surface of an annular member to be included in the sliding component with a laser; and
    a second step of forming the grooves with directionality by scanning a bottom of the dimple with a laser beam so as to draw a single path that is continuous over an entire length or partly discontinuous, wherein:
the path includes a plurality of main path portions corresponding to the grooves with directionality and a plurality of turn-around path portions arranged in a staggered shape at one end sides and the other end sides of the main path portions;
    the main path portions and the turn-around path portions ace alternately connected to each other
    in the second step, a plurality of pairs of first projecting grooves and a plurality of pairs of second projecting grooves are formed in the dimple, each of the pairs of the first projecting grooves including the two first projecting grooves that are connected to first side ends of adjoining two of the grooves with directionality and extend from the first side ends in a direction in which the two first projecting grooves approach each other, each of the pairs of the second projecting grooves including the two second projecting grooves that are connected to second side ends of adjoining two of the grooves with directionality and extend from the second side ends in a direction in which the two second projecting grooves approach each other; and
    the pairs of the first projecting grooves and the pairs of the second projecting grooves are arranged in a staggered shape.

12. The method of producing a sliding component according to claim 11, wherein, in the second step, an output of the laser beam in the plurality of the turn-around path portions is set smaller than that of the laser beam in the plurality of the main path portions.

* * * * *